United States Patent
Schumann et al.

(10) Patent No.: US 12,043,411 B2
(45) Date of Patent: Jul. 23, 2024

(54) SYSTEMS AND METHODS FOR TETHERED DRONES

(71) Applicant: Blue Vigil LLC, Reston, VA (US)

(72) Inventors: Robert Schumann, Reston, VA (US); Gerard Eldering, Reston, VA (US); Charles A. Eldering, Reston, VA (US); Brandon Wernick, Reston, VA (US); Ted Markson, Reston, VA (US)

(73) Assignee: Blue Vigil LLC, Reston, VA (US)

( * ) Notice: Subject to any disclaimer, the term of this patent is extended or adjusted under 35 U.S.C. 154(b) by 0 days.

(21) Appl. No.: 18/548,178

(22) PCT Filed: Sep. 13, 2022

(86) PCT No.: PCT/US2022/076332
§ 371 (c)(1),
(2) Date: Aug. 28, 2023

(87) PCT Pub. No.: WO2023/039590
PCT Pub. Date: Mar. 16, 2023

(65) Prior Publication Data
US 2024/0043138 A1 Feb. 8, 2024

Related U.S. Application Data

(60) Provisional application No. 63/243,389, filed on Sep. 13, 2021.

(51) Int. Cl.
*B64D 47/04* (2006.01)
*B64U 10/60* (2023.01)
(Continued)

(52) U.S. Cl.
CPC ............ *B64D 47/04* (2013.01); *B64U 10/60* (2023.01); *F21V 14/003* (2013.01); *F21V 23/02* (2013.01);
(Continued)

(58) Field of Classification Search
CPC .... B64D 47/04; B64D 2203/00; B64U 10/60; B64U 2101/00; B64U 2201/202; F21V 14/003; F21V 23/02; F21Y 2115/10
See application file for complete search history.

(56) References Cited

U.S. PATENT DOCUMENTS 8,654,189 B1 * 2/2014 Spangler ................ H04N 7/183
348/81
8,991,793 B1 3/2015 Bernhardt
(Continued)

OTHER PUBLICATIONS

International Search Report and Written Opinion, PCT Application PCT/US22/76332, mailed Jan. 31, 2023.
(Continued)

*Primary Examiner* — Donald J Wallace
*Assistant Examiner* — Jalal C Coduroglu
(74) *Attorney, Agent, or Firm* — McDonnell Boehnen Hulbert & Berghoff LLP

(57) ABSTRACT

In an example embodiment, a drone-based system comprises: a base station, wherein the base station is configured to provide drone control and power, a drone; a tether connecting the base station to the drone and configured to provide the drone with the power from the base station; and a lighting system, operably attached to the drone via the tether, configured to generate illumination of a ground area, wherein the illumination of the ground area is controllable by modifying least one of an intensity of the illumination and a height of the drone above the ground area.

17 Claims, 21 Drawing Sheets

(51) Int. Cl.
  *B64U 101/00* (2023.01)
  *F21V 14/00* (2018.01)
  *F21V 23/02* (2006.01)
  *F21Y 115/10* (2016.01)

(52) U.S. Cl.
  CPC ...... *B64D 2203/00* (2013.01); *B64U 2101/00* (2023.01); *B64U 2201/202* (2023.01); *F21Y 2115/10* (2016.08)

(56) References Cited

U.S. PATENT DOCUMENTS

| | | |
|---|---|---|
| 9,174,733 B1 | 11/2015 | Burgess |
| 9,688,404 B1 | 6/2017 | Buchmueller |
| 9,764,838 B2 | 9/2017 | Priest |
| 9,817,396 B1 | 11/2017 | Takayama |
| 10,187,806 B2 | 1/2019 | Priest |
| 10,192,354 B2 | 1/2019 | Terry |
| 10,364,026 B1 | 7/2019 | Hanlon |
| 10,399,704 B2 | 9/2019 | Briggs, IV |
| 10,669,042 B2 | 6/2020 | Molnar |
| 10,723,455 B1 | 7/2020 | Hovey |
| 2004/0167682 A1 | 8/2004 | Beck |
| 2010/0026007 A1 | 2/2010 | Bevirt |
| 2011/0180667 A1 | 7/2011 | O'Brien |
| 2012/0112008 A1 | 5/2012 | Holifield |
| 2013/0200207 A1* | 8/2013 | Pongratz ............. B64U 10/25 244/2 |
| 2013/0307274 A1 | 11/2013 | Sia |
| 2015/0129716 A1 | 5/2015 | Yoffe |
| 2015/0158600 A1 | 6/2015 | Hachtmann |
| 2016/0083115 A1 | 3/2016 | Hess |
| 2016/0096709 A1 | 4/2016 | Averill |
| 2016/0152345 A1 | 6/2016 | Molnar |
| 2016/0264260 A1 | 9/2016 | Hachtmann |
| 2016/0318607 A1 | 11/2016 | Desai |
| 2016/0338166 A1* | 11/2016 | Knaapen ............... F21V 19/006 |
| 2017/0023947 A1 | 1/2017 | McMillion |
| 2017/0137125 A1* | 5/2017 | Kales .................... G09F 9/3023 |
| 2017/0240277 A1* | 8/2017 | Molnar ................ F21S 10/002 |
| 2018/0001941 A1 | 1/2018 | Polidori |
| 2018/0208310 A1* | 7/2018 | Boyk ...................... B64F 1/007 |
| 2018/0259652 A1* | 9/2018 | Shimizu .................. G06T 7/70 |
| 2019/0049944 A1* | 2/2019 | Pohl ..................... G05D 1/0027 |
| 2019/0097722 A1* | 3/2019 | McLaurin .......... H01S 5/34333 |
| 2019/0188879 A1* | 6/2019 | Shen ...................... G06V 10/60 |
| 2020/0148382 A1* | 5/2020 | Tanabe ................. G08G 1/0955 |
| 2020/0225684 A1* | 7/2020 | Anderson ............. B64C 39/024 |
| 2020/0231279 A1 | 7/2020 | Buyse ................... B64U 10/60 |
| 2020/0310466 A1* | 10/2020 | Fischer ................. B64F 1/362 |
| 2021/0061487 A1 | 3/2021 | Briggs, IV |
| 2021/0129982 A1 | 5/2021 | Collins |
| 2021/0269149 A1* | 9/2021 | Culver ................... B64U 50/37 |
| 2021/0276730 A1* | 9/2021 | Jha ....................... H05B 47/105 |

OTHER PUBLICATIONS

Prior, Stephen. (2015). Tethered drones for persistent aerial surveillance applications. http://blog.soton.ac.uk/robotics/files/2015/08/Your-article-pages-78-79.pdf.

Steinhäusler, Friedrich. (2020). EU Cursor Drone Fleet: Fast and cost-effective rescue of victims buried under rubble. International Research Journal of Engineering and Technology (IRJET).

Tethered Done systems for emergency outdoor lighting, Dec. 1, 2020, https://www.uavfordrone.com/tethered-done-system-for-emergency-outdoor-lighting/.

Walendziuk W, Falkowski P, Kulikowski K. The Analysis of Power Supply Topologies for Tethered Drone Applications. Proceedings. 2020; 51(1):25. https://doi.org/10.3390/proceedings2020051025.

* cited by examiner

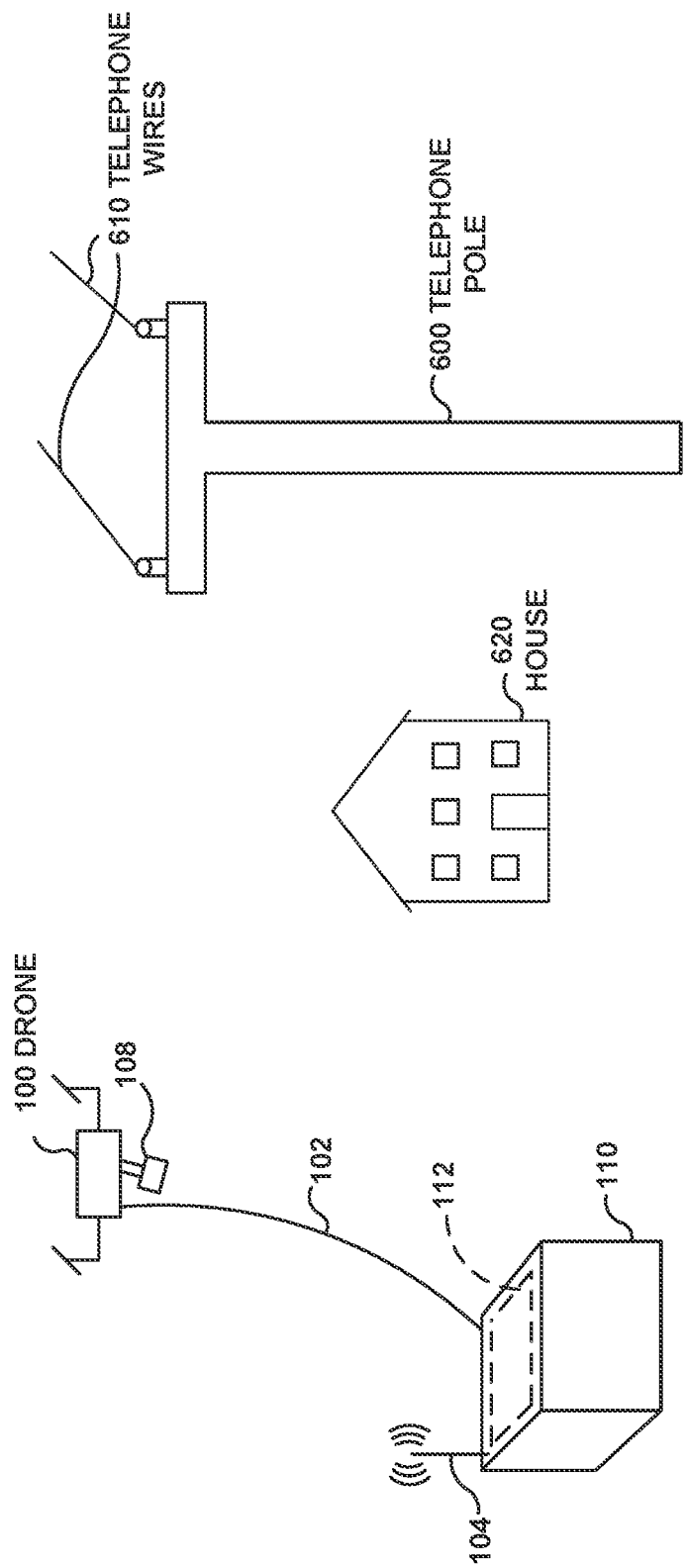
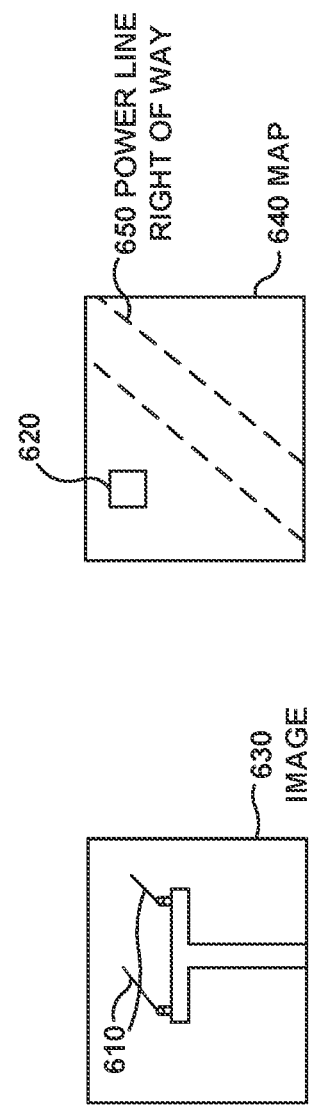
FIG. 6A
FIG. 6B

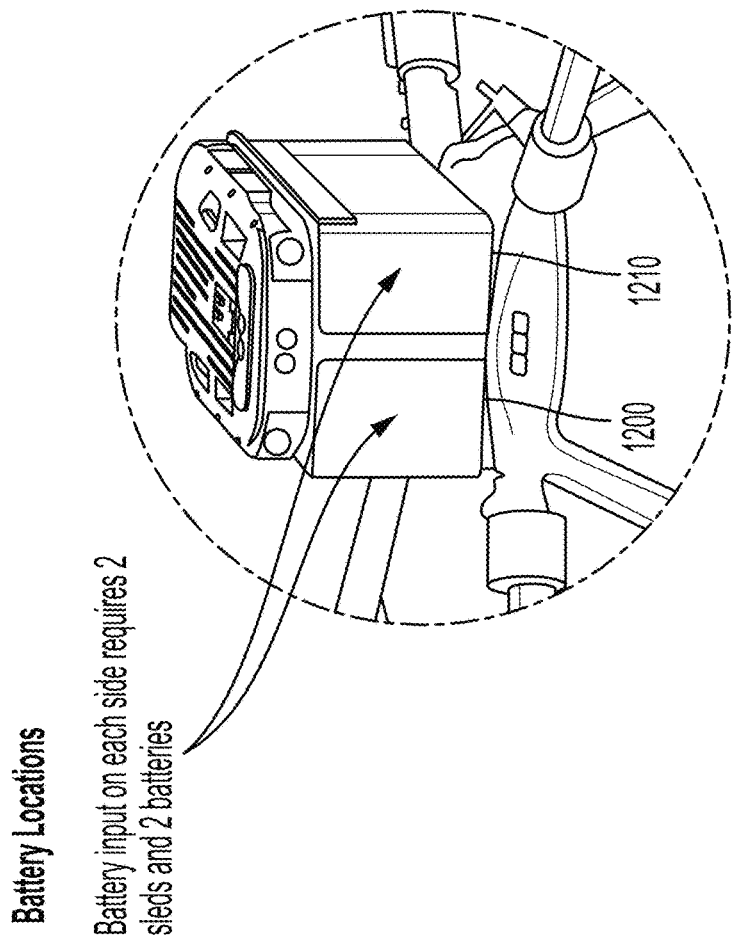
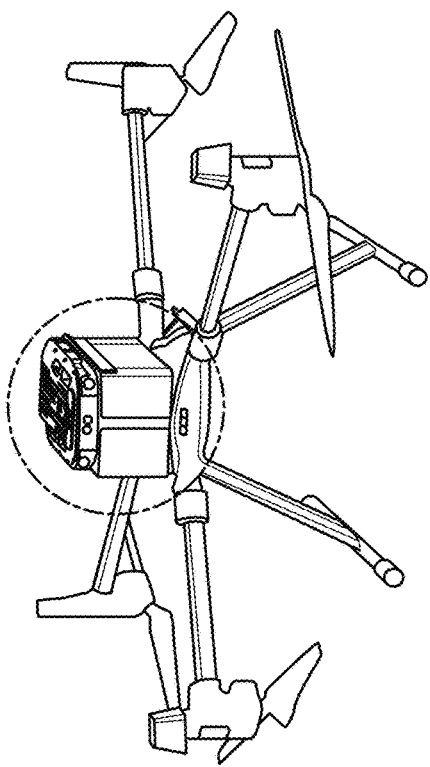
FIG. 12

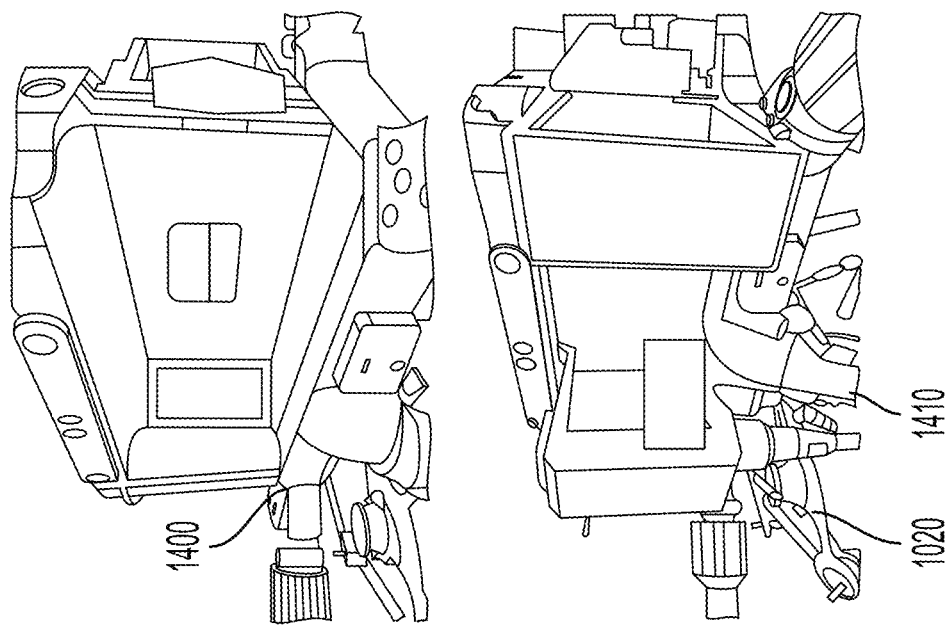
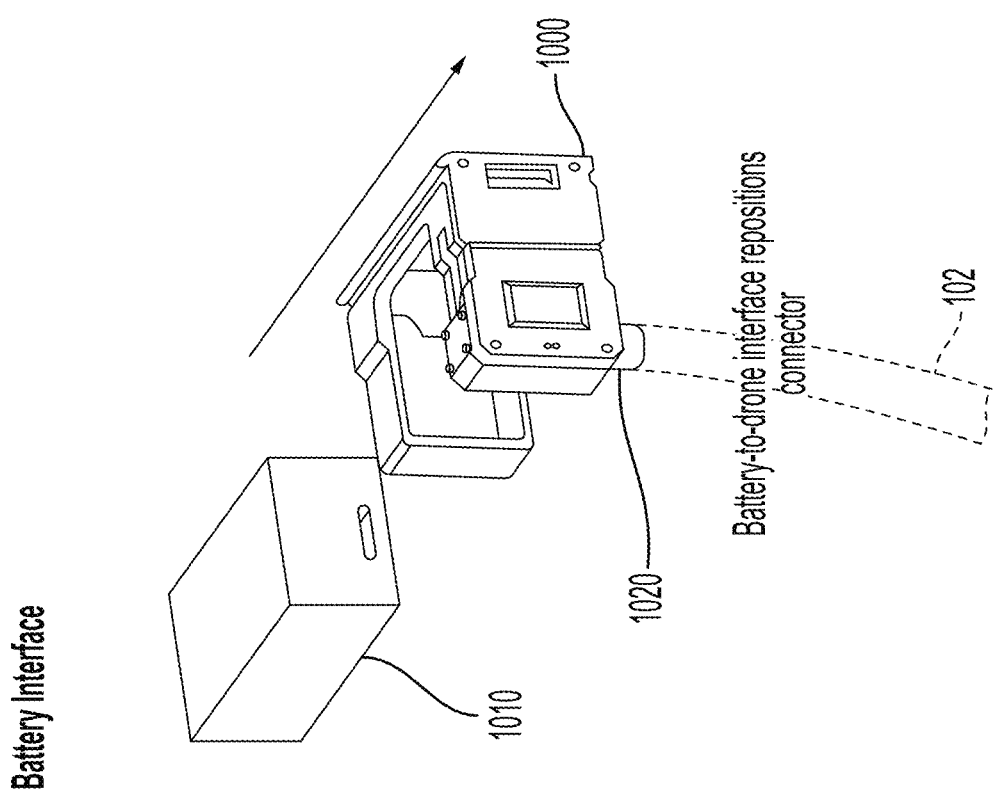
FIG. 14

SYSTEMS AND METHODS FOR TETHERED DRONES

CROSS-REFERENCE TO RELATED APPLICATIONS

This application is the U.S. national phase under 35 U.S.C. § 371 of International Application No. PCT/US2022/076332, filed Sep. 13, 2022, which claims priority to U.S. provisional patent application No. 63/243,389, filed Sep. 13, 2021, which are hereby incorporated by reference in their entirety.

BACKGROUND

Drones, also referred to as unmanned aerial vehicles (UAVs), perform airborne functions without the necessity of a pilot on board. Thus, a drone can be a very light and small device, but can still perform imaging, surveillance, and even delivery functions at low cost. Because drones are typically battery powered, their time airborne is limited to the battery discharge time.

Temporary lighting is frequently used for construction areas, events, security, and other applications where large area illumination is required, both during non-daylight hours as well as in low-light situations. Current illumination units are typically trailered devices with extendable/telescoping poles that place an illumination source at a height of 10'-100'. Such solutions can be expensive, and because the height is relatively limited, require that the illumination be provided at an angle of approximately 20°-50° from the horizon, thus producing a very elongated cone of illumination with fairly uneven coverage.

SUMMARY

It is desirable to have a lighting solution that allows for deployment of the light source at a height such that the illumination can be directed at an angle approximating normal to the horizon or at steeper angles from the horizon than can be obtained via extendable or telescoping poles. It is also desirable to have the ability to readily redirect the illumination, adjust the cone of illumination, and potentially track objects to maintain constant or near-constant illumination on these objects.

A method and system is proposed in which a tethered drone is used to maintain an illumination source at an altitude and an angle that provides for sufficient illumination of the area of interest. In some embodiments, a tethered drone is used to deploy a light source of 80,000-100,000 lumens at a height of 10'-100' with the ability to maintain the illumination source directly or near directly over the area to be illuminated. In alternate embodiments, the drone can be deployed at higher altitudes (e.g. 100'-400') and the light directed to both areas beneath the drone and to surrounding areas, at angles between normal to the surface and the horizon.

In an embodiment, a base station is used to store the drone as well as for providing power to the drone and providing for drone control via a wired or wireless drone controller that is stored in and operably connected (via cable or wirelessly) to the base station. A tether connects the base station to the drone and provides power to the drone for operational use. A lighting system is operably connected to the drone via mechanical and electrical subsystems that both attach the lighting system to the drone (either fixedly or in an adjustable configuration) and provide power for the lighting system. In an embodiment, power is supplied to the drone which then supplies power to the lighting system, while in an alternate embodiment power is routed to the drone and the lighting system separately via cables in the tether that are routed appropriately at the drone. In yet another embodiment, the drone controller communicates directly with the drone, wirelessly or via a cable in the tether carrying control signals, either separately or over the power cable itself (e.g. using Ethernet-over-power or other alternate protocols).

In an embodiment, a light level output adjustment controller is be connected to the lighting system and allows for control of the output level of the lighting system. In an embodiment, the controls for the lighting system are integrated into the drone controller, while in an alternate embodiment the controls for the lighting system are integrated into the base station or placed on a separate lighting controller. Control signals for the lighting system can be transmitted from the controls to the lighting system either wirelessly or via wires embedded in the tether.

Several control modes can be used to maintain the desired lighting from the drone and lighting assembly. In an embodiment the altitude of the drone, as determined via a barometric sensor in the drone which measures an Above Ground Level (AGL) reference, is used to vary the intensity of the lighting such that when the drone is at higher altitudes (further above the ground) the light intensity is increased, and when the drone is at lower altitudes (closer to the ground) the light intensity is decreased. In an alternate embodiment, the distance of the drone from the base station is measure via the amount of tether that is deployed. In this embodiment, the vertical distance of the drone from the base station, the horizontal distance of the drone from the base station, or a combination of the two distances, can be used to vary the intensity of the lighting. In other embodiments, alternate height control and altitude monitoring including LIDAR, GPS, and/or RTK GPS can be used.

In an embodiment, both the altitude of the drone and the intensity of the light are varied to obtain a desired or specified intensity of illumination. The desired intensity of illumination can be determined via measurement, obtained via light meter (either standalone or incorporated into a device such as the base station, drone or lighting controller unit, or a smart phone) or as determined via visual observation by an operator. In an embodiment, an operator can place a reference card containing suitable graphics in the area of illumination to determine if the illumination is within the specified range. In an alternate embodiment the light output can be calculated based on one or more operating parameters including but not limited to the current being consumed by the lighting system, or current and voltage to the lighting system. The calculated value can be stored and used in conjunction with the height of the drone above the surface to calculate the amount of light (intensity of illumination) on the ground.

In an embodiment, the lighting system comprises a plurality of individually addressable intensity-controlled lighting units. As an example, four separate lighting units can be used, each of the lighting units having a variable output intensity. Having individually addressable lighting units provides the ability to vary the lighting across a surface, either to obtain a higher degree of lighting in one area, or to have relatively uniform (quasi-uniform) lighting across a given region. In the instance where the lighting system is at an angle relative to ground (e.g. not pointed directly at, or normal to the ground) one portion (e.g. the top half) of the lighting system will need to be operating at a higher intensity than the lower part of the lighting system to create quasi-uniform lighting of the illuminated surface region. When used herein the term quasi-uniform indicates that the lighting is intended to be uniform across the illuminated region, and although there may be some spatial variations in intensity the intent is to have the illumination be as close to uniform as possible.

In an embodiment, the lighting system is directionally variable or alterable, such that the lighting system can be directed, either straight down (horizontal orientation), at an angle, or in vertical or near vertical orientation (for illumination of a vertical surface such as the side of a building). This is accomplished via use of an electro-mechanical gimbal having one or more axes that allow adjustment along the axes. In an embodiment, a three-axis gimbal is used, allowing for adjustment of the pitch, roll, and yaw of the lighting system. The controls for the lighting system can be incorporated into the drone controller, the base station, a separate independent controller, or into an existing device such as a smart phone. Commands can be sent to the lighting system via wires, wirelessly, or a combination of the two such as when a wireless controller communicates to the base station which then relays commands to the lighting system on the drone via one or more cables in the tether. Other mechanical and electro-mechanical arrangements for making the lighting system directionally adjustable can be utilized including mechanical, electro-mechanical, and piezoelectric single axis tilt mechanisms, pan-tilt systems, and other configuration known to one of skill in the art that provide for pitch control, yaw control, or roll control, and combinations thereof. The gimbal can also be used in combination with an automated flight control system incorporated in the drone, such that as the drone reacts to flight conditions (e.g., wind gusts, turbulence, sudden changes in altitude) and the gimbals are automatically adjusted to ensure that the display of the light on the target surface remains stable. As such, the gimbal provides a tracking function in addition to a basic pointing function. In another embodiment, controls can be split such that a ground controller is used to determine a specific geolocation for the light, with the drone flight controller then automatically adjusting the gimbals to point the lights at the desired target(s) based on the current fight orientation of the drone.

The directionally alterable lighting system can be utilized both to direct illumination toward a specified area as well as obtain the desired degree of lighting. In an embodiment, the drone is placed to the side of (horizontally displaced from) the area where the lighting is desired and tilted to provide indirect lighting.

The direction of the lighting system can be varied in conjunction with the lighting intensity to achieve the desired coverage and level of illumination. As with other embodiments, the altitude of the drone can be monitored and the intensity of the illumination varied based on the altitude to maintain a desired spatial coverage or degree of illumination, or the altitude of the drone can be varied to increase or decrease the area illuminated.

In another embodiment, the lighting system is comprised of a plurality of independently addressable lights that can also be independently directed. In this embodiment, both the direction and intensity of each light can be varied to create customized illumination. As with the other embodiments, the altitude and attitude of the drone can be incorporated into the directional and intensity setting of each light. In an embodiment, four lights, each of which can be independently directed and whose intensity level can be independently controlled are used.

As will be understood by one of skill in the art, having independently addressable lighting units which can be directionally controlled as well as having controllable intensity levels allows for the ability to obtain a desired illumination pattern including higher illumination in one area than another, specific illumination shapes (e.g. square, rectangular, oval, circular or approximations thereof) and customized illumination in which a vertical surface and a horizontal surface can be simultaneously illuminated. The altitude of the drone can also be varied to control the area to be illuminated, or monitored to incorporate into the calculation of how to set the direction and intensity of the independently addressable lighting units to obtain a specified or quasi-uniform illumination pattern An embodiment may involve a drone-based system comprising: a base station, wherein the base station provides power; a drone; a tether connecting the base station to the drone and providing the drone with the power; and a lighting system operably attached to the drone for providing illumination.

An embodiment may involve a drone-based system comprising: a base station, wherein the base station provides power; a drone; a tether connecting the base station to the drone and providing the drone with the power; a lighting system operably attached to the drone for providing illumination; and a light level output adjustment controller electrically connected to the lighting system.

An embodiment may involve a drone-based system comprising: a base station, wherein the base station provides power; a drone; a tether connecting the base station to the drone and providing the drone with the power; a lighting system operably attached to the drone for providing illumination; an illumination monitor; and a light level output adjustment controller electrically connected to the lighting system.

An embodiment may involve a drone-based system comprising: a base station, wherein the base station provides power; a drone; a tether connecting the base station to the drone and providing the drone with the power; a lighting system operably attached to the drone for providing illumination; and a light directional controller electrically connected to the lighting system.

An embodiment may involve a drone-based system comprising: at least one base station, wherein the base station provides power; a plurality of drones; at least one tether connecting the at least one base station to at least one drone of the plurality of drones and providing the at least one drone with the power; and a lighting system operably attached to the at least one drone for providing illumination, wherein one or more parameters of at the least one drone is configurable to provide desired illumination from the lighting system.

An embodiment may involve a drone comprising: a propulsion system configured to cause the drone to fly; a lighting system operably attached to the drone for providing illumination; and a port for a tether that connects the drone to a base station, wherein the tether provides the drone with power from the base station, and wherein the power is used to operate the propulsion system or the lighting system.

An embodiment may involve a base station comprising: a drone receiving area on which a drone can be disposed; a power supply for providing power to the drone; and an attachment for a tether connecting the base station to the drone and for providing the drone with the power for a propulsion or lighting system of the drone.

An embodiment may involve launching, from a base station, a drone, wherein the drone is connected to the base station by a tether, wherein the drone includes a lighting system, and wherein the base station supplies power for the lighting system by way of the tether; causing the drone to fly to a specific altitude; and activating the lighting system to provide downward illumination to a surface.

An embodiment may involve a heat removal system that uses a forced air source to remove heat from a heat source having cooling fins through use of a flexible duct for receiving air from the forced air source and guiding the received air over the heat source including the surface containing cooling fins, wherein the flexible duct accommodates rotation along at least two axes. The system can utilize a cowling for sealing and directing the airflow along at least one direction, wherein the system allows rotation while sealing and directing the airflow.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIGS. 6A and 6B illustrate objective hazards and the use of imaging systems and maps for objective hazard avoidance, respectively, in accordance with example embodiments;

FIG. 12 illustrates a dual sled configuration, in accordance with example embodiments;

FIG. 14 illustrates the repositioning of the battery connector, in accordance with example embodiments;

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Herein, the terms "drone", "unmanned aerial vehicle", and "UAV" may be used interchangeably.

Herein, the term "surface" generally refers to a target location that the drone is configured to illuminate. While a surface may be the ground, it could also be water, a platform, an indoor surface, a wall, an irregular surface, or some other type of surface.

Figure 1:
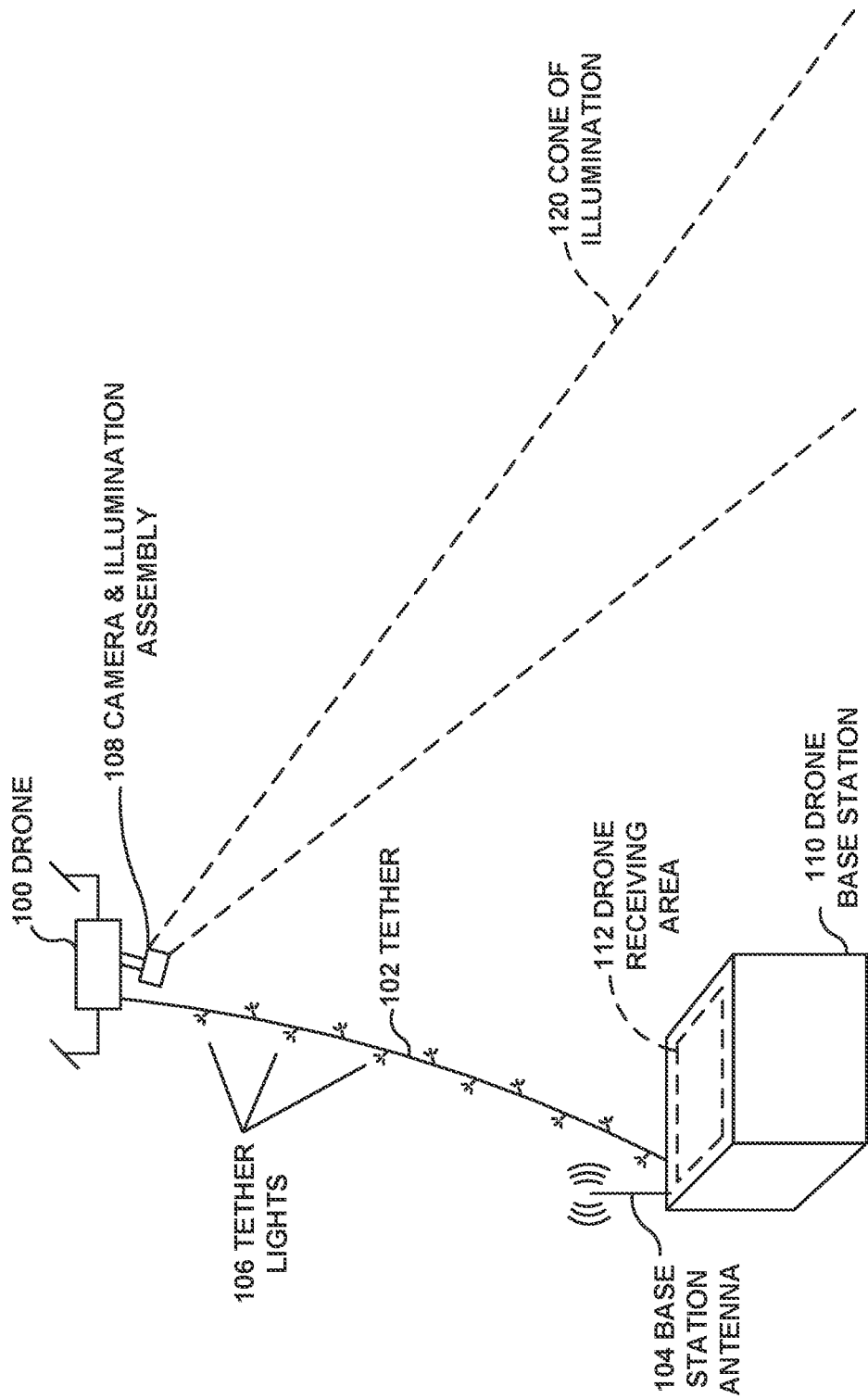
FIG. 1 illustrates a tethered drone used in a lighting application, in accordance with example embodiments.

FIG. 1 illustrates a configuration of a drone providing illumination in which drone 100 is launched from a drone base station 110, the drone base station 110 having a drone receiving area 112 in which drone 100 resides when not in use. A tether 102 connects drone base station 110 to drone 100 and provides power and/or data communications to drone 100. Tether 102 may also have tether lights 106 that indicate the presence of tether 102 to personnel and other airborne objects (e.g. occupied and unoccupied aircraft). Drone base station 104 may also have radio communications capabilities including a base station antenna 104, which allow for communications to other devices and for general network (e.g. Internet) access.

In some embodiments, the tether is active and provides management of the tension on the tether. This may involve automatically releasing tether as the drone climbs, then maintaining constant tension when the drone is hovering (thereby accommodating wind gusts, and mechanical intrusion on the tether), and automatically retracting the tether onto a spooling mechanism when the unit descends. The tension mechanism can be implemented in a variety of ways. One example is an electrical motor configured to spin in such as a direction as to provide a reeling-in force to the tether, coupled with a slipping clutch, such as a magnetic particle clutch, which is adjusted to provide a specific amount of force transfer from the motor to the tether via the spool on which the tether collects. This effectively creates a force (tension) on the tether. The clutch torque and motor speed can be adjusted to affect a broad range of operating functions, including a high force, slow speed pull in of the drone, such as might be used for landing, as well as for a low tension setting where the drone can pull the cable from the base. As the end of tether is sensed by the operating system in the box, the torque on the clutch can be increased to act as a brake on the vertical ascent of the drone. Other configurations with tension measurement via deflection and wheel positioning can be used in conjunction with stepper or other electric motors to provide similar capabilities.

A camera and illumination assembly 108 is mounted on drone 100, typically hanging from below and attached to drone 100 using a gimbal, stabilizer, or other mechanical or electro-mechanical system that allows for positioning of the camera and illumination source separately from the positioning of the drone. In one or more embodiments, the illumination emanates from the surface of camera and illumination assembly 108 parallel to a target surface (e.g., the ground), while in alternate embodiments the illumination emanates from a surface on the camera and illumination assembly 108 that is perpendicular to the target surface. Illumination may also emanate at angles other than parallel or perpendicular to the target surface. Although shown as a combined unit, camera and illumination assembly 108 can be designed and deployed as two separate systems, including having separate and independent gimbals, stabilizers, and mechanics for independent positioning.

Camera and illumination assembly 108 produces a cone of illumination 120 that provides the desired lighting. In one or more embodiments, the illumination source provides 80,000-100,000 lumens and can readily illuminate areas of approximately 100'×100' on a surface. In alternate embodiments where less illumination is required, smaller light sources can be deployed, or conversely for more illumination a larger, more powerful light source can be deployed. Although cone of illumination 120 can be a true cone, producing a circular or oval area of illumination (depending on the angle of illumination), other shapes are possible, including trapezoidal (resulting in a somewhat rectangular area of illumination). As such, when used herein, the term "cone of illumination" refers to all shapes and configurations of the illumination produced by camera and illumination assembly 108. The shape of illumination can also have interior cutouts, such as a doughnut shape where the cutout area has limited or no light coverage.

As will be appreciated by one of skill in the art, a variety of power supply configurations can be used to power the drone and the lights. In an embodiment, separate power supplies are used for the drone motors (e.g., motors that power the drone's flight capabilities) and the lights (e.g., camera and illumination assembly 108), with a 400V DC signal being sent via the tether for conversion to a 24V constant voltage signal to operate the drone motors (as well as cooling motors if present) and a separate 400V DC signal being sent via the tether for conversion to a nominal 36V constant current signal to operate the lighting system.

In one embodiment, the power supply system additionally charges a backup battery in the drone that allows the drone to both stay aloft as well as providing reduced lighting (low light mode) in the event of failure to the tether-based power. In an embodiment, active noise suppression is also used to keep electrical interference out of the power supply lines.

Figure 2:
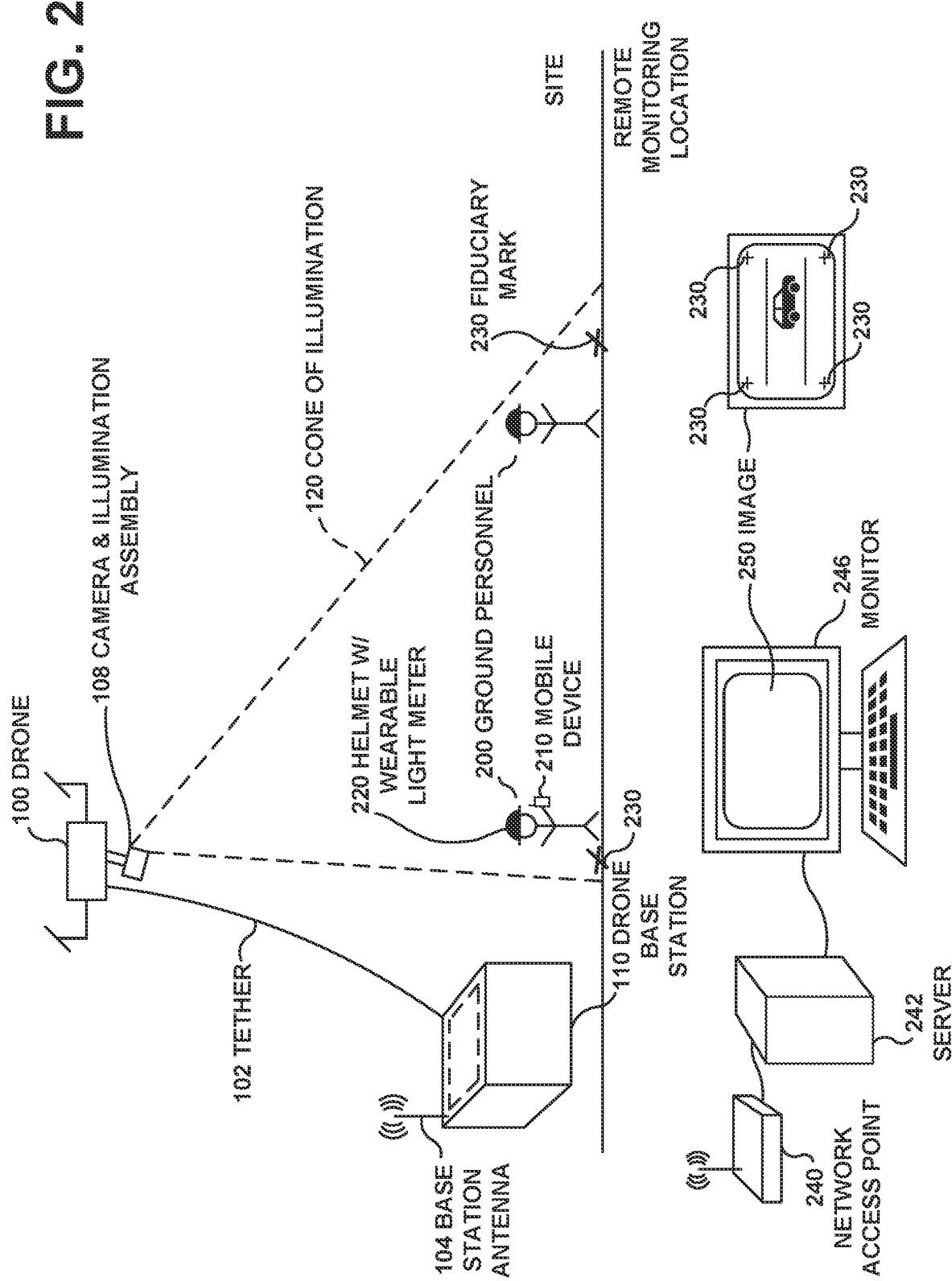
FIG. 2 illustrates a tethered drone in a lighting application using imaging and feedback for illumination control, in accordance with example embodiments.

Referring to FIG. 2, drone 100 can be deployed with camera and illumination assembly 108 to create cone of illumination 120, with the level of illumination being monitored on the surface by light monitoring devices, which in one or more embodiments, are carried or worn by ground personnel 200. In one or more embodiments, ground personnel 200 carry a light sensing device (e.g., a light meter) that can be integrated into a mobile device 210, or incorporated into a helmet/wearable light meter 220. In such embodiments, the light sensing device also knows the general location of where the measurement is taken (e.g., via the global positioning system (GPS) or triangulation from wireless network signals), and camera and illumination assembly 108 can increase or decrease the illumination at that point, using active illumination control as described below. Other types of wearable or portable light sensing devices can be used and incorporated into clothing or work articles carried by ground personnel 200 or mounted on objects or work devices within and near the illuminated area.

The light available on the surface can also be measured from drone 100, which is carrying the camera and illumination assembly 108, using the camera or a stand-alone or integrated light measuring system with optics and an optical path designed to primarily capture light reflected from the surface or other illuminated surface.

In one or more embodiments, fiduciary marks 230 are used to provide information back to the imaging system of drone 100. The fiduciary marks can be in the shape of an 'X' and made from a highly reflective material, although other shapes and configurations that provide sufficient discrimination from the background can be used. For example, in highly reflective environments including snow, ice, and sand, dark (light absorbing) fiduciary marks may be more appropriate than highly reflective ones.

As shown in the lower half of FIG. 2, the illumination can be monitored at a remote monitoring location in which a signal from the drone 100 or drone base station 110 is received, typically via the Internet and at a Network Access Point (NAP) 240. An image 250 from drone 100 displayed on monitor 246, which in one or more embodiments is connected to server 242. In one or more embodiments, server 242 performs image or illumination analysis on image 250. The uniformity of the illumination can be measured via automated analysis or by visual inspection by personnel. When fiduciary marks 230 are utilized, the degree of illumination on the marks can be used as a basis for determining the sufficiency or uniformity of the illumination.

Image 250 can also generally be analyzed using a variety of standard image processing techniques including but not limited to classification, feature extraction, multi-scale signal analysis, pattern recognition, and projection. Image 250 can be used for analysis of the illumination of the area, analysis of work being performed, inspection of an area for any purpose including construction progress, security, crime scene analysis, material stress analysis, livestock monitoring and monitoring for the presence/absence of animals, crop inspection and analysis, and other inspections and analyses where the illumination provided by camera and illumination assembly 108 may need to be modified to facilitate the inspection. The illumination source of camera and illumination assembly 108 can be appropriately manipulated, as will be discussed, to provide more specific illumination, instruction, guidance, or marking to complete either an automated or human-based analysis. Any such analysis may be performed by drone 100, by camera and illumination assembly 108, and/or by a remote computing system.

In one or more embodiments, the illumination is set to a particular level through adjustment of the height of drone 100. A value for constant illumination can be set (e.g. 50 LUX) and that value maintained by varying the deployed height of drone 100, with a higher altitude resulting in a lower value of illumination. This technique is particularly useful when the illumination source is of a fixed value.

Drone 100 can also be set to maintain a particular light level on the surface as drone 100 changes its altitude. This provides both a safety value in that operators and other personnel on the surface are not blinded by the highly intense light, as well providing a constant illumination over the work area.

Notably, drone 100 may be remotely controlled by humans or by software, either directly by way of wireless communication between a control device and drone 100, or by way of base station 110.

Figure 3A:
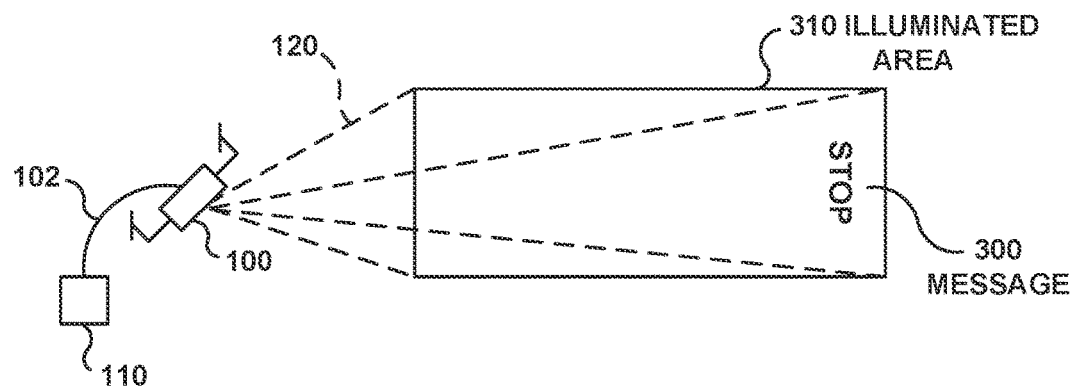
FIGS. 3A and 3B illustrate messaging and marking using tethered drones, respectively, in accordance with example embodiments.

Referring to FIG. 3A, drone 100 can produce an image 300 on illuminated area 310. In one or more embodiments, a gobo projection light is used to create a shadow that contains a message, such as the "STOP" indication shown in FIG. 3A. As such, a temporary traffic instruction such as stop, yield, slow down, or other messages can be provided via illumination. In alternate embodiments, a laser based mechanism, microelectromechanical systems (MEMs), or other controllable optical writing system is used to produce image 300.

Figure 3B:
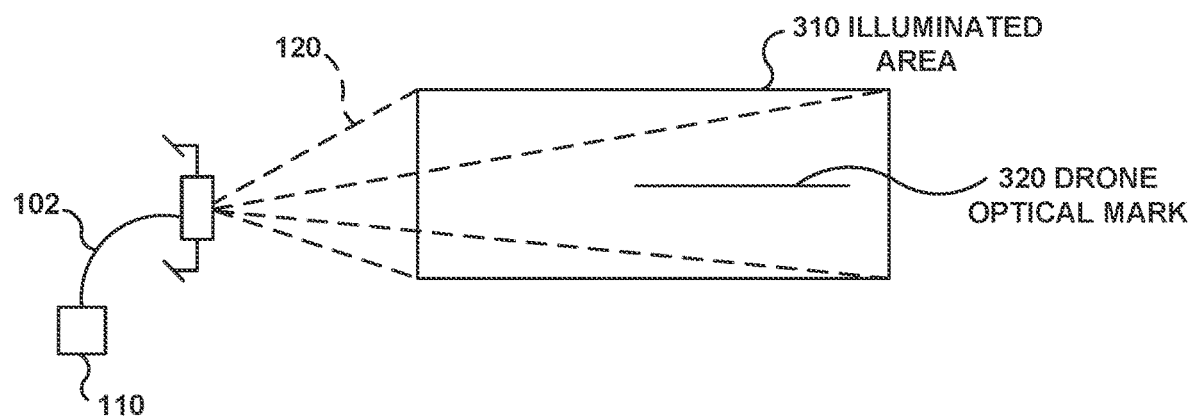

Referring to FIG. 3B, a drone optical mark 320 is placed in illuminated area 310 to provide marking for construction, inspection, agricultural (e.g. planting), or to provide guidance for other activities. In one or more embodiments, a He—Ne laser beam from a small He—Ne laser contained in camera and illumination assembly 108 is used to provide drone optical mark 320. In alternate embodiments, other controllable optical writing systems (such as laser based mechanisms, microelectromechanical systems (MEMs), or other controllable optical systems) are used to produce optical mark 320.

Messaging and marking provided as illustrated in FIGS. 3A and 3B can be used in a variety of applications including construction, where guidance such as "STOP" is provided for safety reasons, and drone optical mark 320 is used for marking a construction line or otherwise providing guidance for the construction, or for determining the extent to which the construction is within specification and specification tolerances.

In other embodiments, the analysis of image 250 is performed to determine if illuminated area 310 has been illuminated properly and to adjust the illumination appropriately and as needed. In construction applications, this can involve illumination of areas under construction, analysis of the construction and adjustment of the illumination to either create more uniform illumination or because an area needs additional illumination for inspection.

In one or more embodiments, drone 100 is placed on a moving vehicle such as a construction truck or tractor, and moves with the activity taking place (e.g., paving in the case of construction or planting in the case of agriculture). Image 300 or drone optical mark 320 are used to provide guidance for the construction or agricultural activity and can indicate the intended path for that activity.

A follow-me feature can be provided in which the motion of a user is tracked via imaging by the drone, reflection from a laser tracking beam, geolocation via a GPS unit held by the user, or other location mechanism. In one or more embodiments, the ground control unit is tracked by the drone. In any of these embodiments, a follow-me function can be activated in which the light follows the user. The drone system tracks the motion of a ground control unit or other marker and causes the illumination to follow a user, either through motion of the drone, motion of the lighting system, or a combination of both. In addition, the ground unit can also be on a mobile device or vehicle, either with a manual movement capability, or self-propelled, including with automatic following capabilities.

In alternate embodiments, drone 100 providing illumination and messaging/marking is used for crime scene analysis. In such embodiments, image 250 can be analyzed on server 242 to determine particular aspects of a crime scene including but not limited to the presence of shell casings, bodies, blood, and other crime related artifacts. In one or more embodiments, the image analysis includes the analysis of the presence and locations of the shell casings and specifics about the positions of a body or bodies. An image 300 or drone optical mark 320 can be used to indicate areas for additional analysis, instruct personnel on the scene, or record images/video of specific areas while using additional illumination. In one or more embodiments, image analysis of the scene is used to determine possible trajectories for bullets that were fired and to postulate the locations of the shooters. In one or more embodiments, drone 100 receives instructions based on the image analysis and provides imaging or illumination of specified areas.

In one or more embodiments, illumination from drone 100 may cover a specified area and as a user utilizing the light for a specific purpose approaches the edge/limitation of the illuminated area, the drone can, by monitoring the position of the user, signal via an optical signal (e.g. blinking, flash, double flash) or other signal (e.g. message to app on a mobile device) indicating that the drone needs to be re-positioned.

In some deployments, two or more drones may be used in tandem or parallel to provide overlapping or non-overlapping illumination. For example, an outdoor soccer event might require or benefit from four drones illuminating a playing field from each of its corners. These drones may be centrally controlled via a computer or mobile device (e.g., laptop, phone, tablet, etc.), and may provide live video feeds to such a controller.

A camera integrated into the drone can be used to assist with both lighting as well as for safety and operation of the drone/lighting system. In an embodiment, a camera integrated with or associated with the drone points down or at an angle to make the ground station visible. The camera can be used for a precision landing or to determine an encroachment into the landing area. In an embodiment, an encroachment area is defined, either by a radius from the base station or via establishment of a perimeter (e.g. via an application allowing the user to draw the perimeter on an image obtained via the camera). In an embodiment, the drone remains within the defined radius or perimeter and the operator is not allowed to move the drone outside of that radius or perimeter. As will be understood by one of skill in the art, the perimeter can be circular when defined as a radius, but is not constrained to that shape, and arbitrary shapes based on lines and arcs can be defined via the user interface.

By establishing a perimeter, the security of the unit can be increased via detection of an encroachment, which can result in generation of an alarm (which may be audible or simply transmitted to an operator or authority person). In an embodiment, the drone remains in a perpetual hover to eliminate the possibility of tampering by unauthorized personnel, or damage to the tether due to inadvertent encroachment (e.g. a vehicle having backed into the landing area). In an alternate embodiment, a motion sensor is used, either as part of the camera and associated software or as an independent system separate from the camera. In an embodiment the motion sensor can be used in conjunction with the lighting system to track an object by directing the lighting at the moving object, moving the drone over the object, or a combination of directing the lighting and moving the drone. As will be understood by one of skill in the art, the camera would typically be shrouded to prevent flooding by the illumination from the lighting system.

Figure 4A:
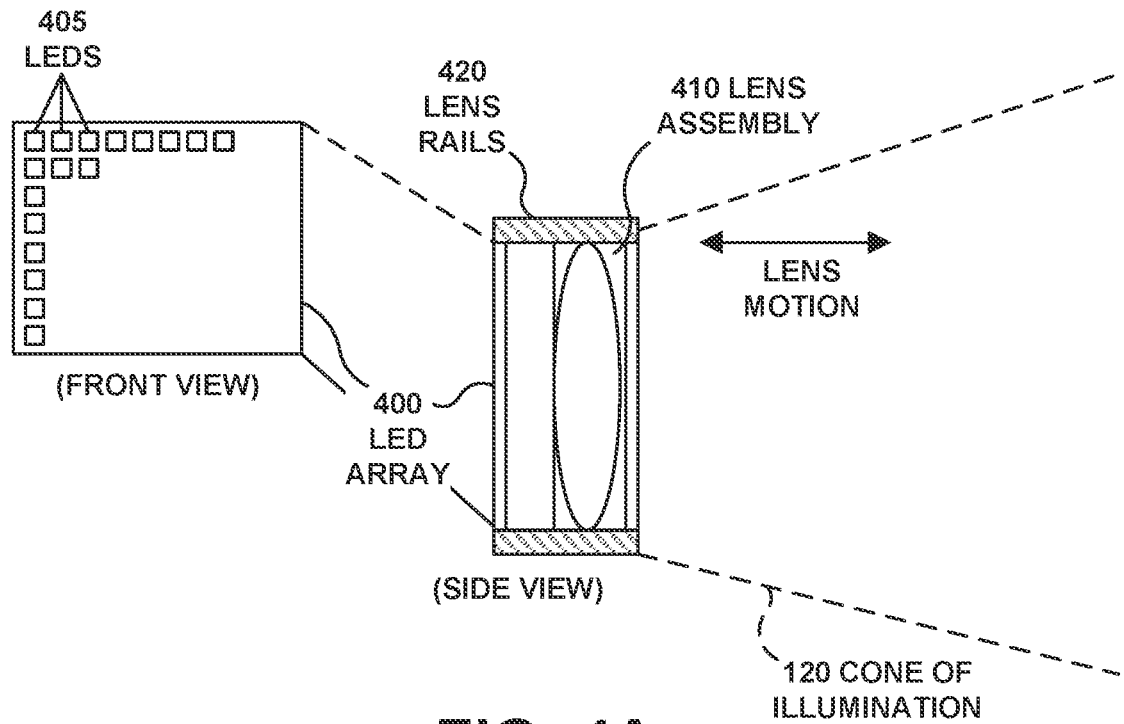
FIGS. 4A and 4B illustrate illumination assemblies using electro-mechanical and electro-optic lenses, respectively, in accordance with example embodiments.

Referring to FIG. 4A, an illumination assembly is illustrated. The illumination assembly can be integrated with the imaging system/camera into camera and illumination assembly 108. In alternate embodiments, the illumination system is separate from the imaging system, has its own gimbal or other mechanical positioning system, and can be pointed separately from the camera. As shown in FIG. 4A, the illumination system can be based on a Light Emitting Diode (LED) array 400 with individual LEDs 405 arranged in a matrix fashion. In alternate embodiments, LEDs 405 can be arranged in a circular or other geometric shape. LEDs 405 may all be of the same type and optical wavelength, or the arrangement can be constructed using different LEDs including colors (e.g. red, green, and blue) or other combinations of LEDs emitting at different optical wavelengths. In one or more embodiments, infrared (IR) emitting LEDs are used to provide illumination in the IR range. This can provide for night surveillance or discrete illumination of an area.

In one or more embodiments, LED array 400 is activated in a manner to direct light via a specific activation pattern. This can be accomplished by using LEDs 405 that project in different directions and activating those LEDs that can create the desired illumination pattern. In one or more embodiments, Adaptive Driving Beam (ADB) technology is used to change the shape, brightness, and direction of the light. This can be done both through activation of LEDs in LED array 400 as well as through the use of shutter systems, active gobos, and feedback in combination with any of the possible methods for the direction or modulation of the light.

Referring again to FIG. 4A, the side view illustrates the use of LED array 400 in combination with a lens assembly 410. Lens assembly 410 can be comprised of one or more lenses that act to focus, defocus, or otherwise direct light from LED array 400 to create the desired pattern and illumination for cone of illumination 120. In one or more embodiments, lens assembly 410 includes a single lens, while in alternate embodiments lens assembly 410 includes a number of lenses. The lenses may be conventional curved lenses, spherical, or aspherical (e.g. convex or concave), whereas in alternate embodiments Fresnel lenses are used to obtain flatter and more compact lenses. As illustrated in FIG. 4A, lens assembly 410 can be mounted on lens rails 420 to modify the distance between the optical source (e.g. LED array 400) and the lens assembly 410. Although lens rails 420 are illustrated as a threaded system in FIG. 4A, a number of other mechanisms including mechanical and electro-mechanical systems can be used to adjust the distance between lens assembly 410 and the optical source. Such mechanisms are common in cameras with autofocusing and with the ability to zoom via electronic control. Such mechanisms include gears, wheels, teeth, stepper motors, and other types of motors that typically convert an electrical signal such as current into motion via electromotive and/or magnetomotive principals.

Figure 4B:
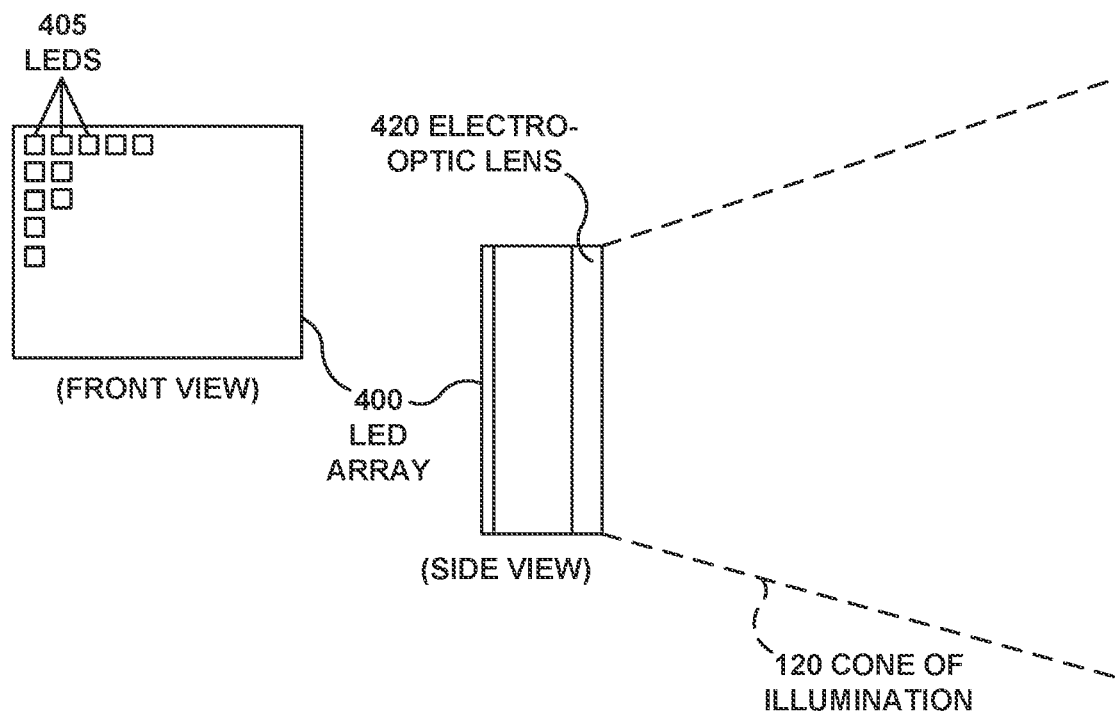

FIG. 4B illustrates an alternate method of modifying cone of illumination 120, in which an electro-optic lens 420 is used to alter the projection of the light. In one or more embodiments, liquid crystal lenses are used to create a conventional or Fresnel lens to modify cone of illumination 120. In alternate embodiments, other types of electro-optic materials or assemblies such as electro-optic polymers, electro-chromic materials, electro-optic etalons, or other materials in which the optical indices of the lens can be changed via the application of an electric field can be used.

As will be understood by one of skill in the art, combinations of mechanical and electro-optic systems such as those illustrated in FIGS. 4A and 4B can be used to modify cone of illumination 120 to provide the desired illumination pattern. Additionally, single source illumination, such as a bulb (e.g., incandescent, fluorescent, halogen, sodium, or laser) can be used as the source of light instead of LED array 400.

Furthermore, the intensity of light produced at various points on the surface in such a cone of illumination may be based on the distance between the drone and these points. As the cone of illumination may extend farther from the drone in some directions than others, different points on the cone may experience light of different intensities. In some embodiments, the drone may seek to produce light that has a pre-determined target intensity at one or more locations within the cone. The drone's altitude and the angle of the light source with respect to the surface may form a triangle (e.g., a right triangle), such that the drone can estimate the intensity of the light at various points within the cone using algebraic and/or trigonometric equations. Then, the drone can vary the intensity that it produces and/or its altitude in order to achieve the target intensity within at least part of the cone. These calculations could be implemented by the lighting controller on the drone itself, or the light output could be continually modified by the base station controller as it gets feedback on drone altitude.

The lighting system, whether comprised of single light source, a plurality of light sources, or light sources that can be mechanically moved or pointed, can also utilize lens systems that allow for the light to be focused (or defocused) on a particular area. In an embodiment, different focal length lenses are used interchangeably to provide spotlight to broad area illumination. In an embodiment, a 30-degree lens (having a 30 degree field of view) is used to produce well-defined and focused high-intensity beam, while a 90-degree lens (having a 90 degree field of view) can be used to produce a broad beam. Lenses can be substituted mechanically or electromechanically, or electronically using liquid crystal lenses or other electro-optic materials or configurations. When used in combination with moveable light sources, arbitrarily shaped illumination patterns can be created. As previously discussed, use of a camera in combination with the lighting system allows for monitoring of the illumination pattern. In an embodiment the illumination pattern captured by the camera is compared to a pattern previously defined an operator and the lighting system is adjusted, via the lenses, directing the lights, or both, to achieve the desired illumination pattern or coverage.

In an embodiment, the light temperature and color can be altered for specific applications, such as an outdoor movie (e.g. background illumination for security) or for a concert. By adjusting the color and temperature of the light, the color spectrum can be optimized for the application. In an embodiment, the lighting from the drone system is used as part of a light show for a concert, festival, or other event.

As will be understood by one of skill in the art, different units can be used to describe the illumination provided by the drone and associated lighting system. Radiometric quantities, describing measurements of electromagnetic radiation can be used, as well as photometric quantities measuring the response of the human eye to light. For radiometric quantities, the typical measurements include flux as a unit of power measured in Watts; flux per unit area, known as irradiance ($W/m^2$); flux/solid angle, known as radiant intensity and measured in W/sr; and flux/(area*solid angle), known as radiance and measured in $W/(m^2*sr)$. For photopic units, typical measurements include luminous flux measured in lumens (lm); illuminance measure in lm/m2 or lux; luminous intensity as measured in lm/sr or candela (cd) and luminance as measured in $lm/(m^2*sr)$, cd/m2, or nits.

The intensity or brightness of light as a function of the distance from the source follows an inverse square relationship under most circumstances. In the present application, if the flux or luminous flux of the light source remains constant the intensity of the light on the ground will decrease as $1/h^2$ where h is the height of the drone above the ground. In an embodiment, the drone operates in a range of 100 ft.-400 ft. height above the ground (altitude) and the lighting intensity is varied to maintain a constant state of irradiance (or illuminance) on the target surface (e.g. ground) based on the inverse square relationship between the height of the drone and the intensity of the light. In an embodiment the current to the lighting system is varied to alter the amount of light power generated by the lighting system such at as the drone ascends the current to the lighting system is increased, and as the drone descends the current to the lighting system is decreased. As an example, a lighting system comprised of eight CREE CXB3590 LED COB arrays would require 689 watts to provide approximately 8,000 sq. ft. of usable light from a drone operating at approximately 100' with the optical system configured to implement a sixty (60) degree beam spread.

Figure 5:
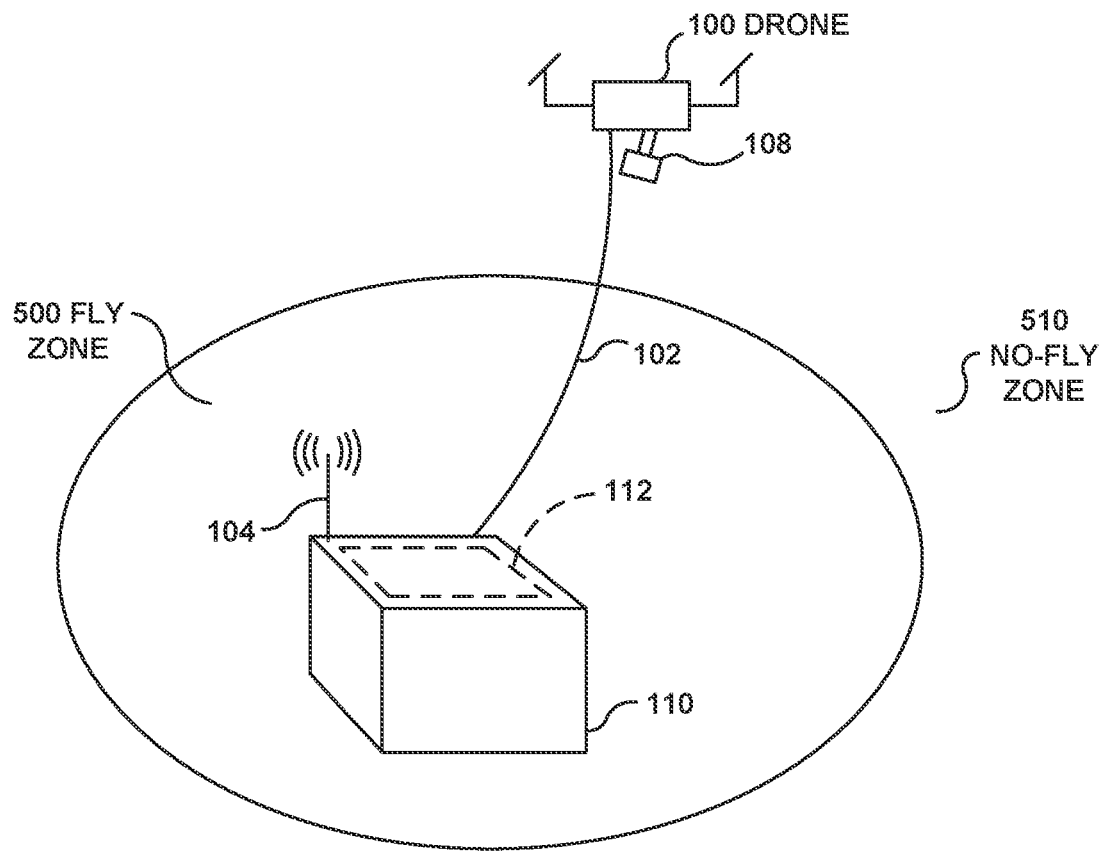
FIG. 5 illustrates use of a defined fly zone and no-fly zone for drone applications, in accordance with example embodiments.

Referring to FIG. 5, the use of fly and no-fly zones is illustrated, in which drone 100 connected via tether 102 is flown from drone base station 110 which is placed in fly zone 500 but which borders no-fly zone 510. Drone 100 can be programmed with data defining no-fly zone, based on digital maps, preprogrammed borders, or other navigational information entered into either drone 100 or drone base station 110. In one or more embodiments, data is entered through a control panel, handheld device, or other unit associated with drone base station 110. In alternate embodiments, information is accessed from a remote unit such as server 242, or another database containing information sufficient to mark the no-fly zone 510. In one or more embodiments, a GPS unit is contained within drone 100 such that it can determine its position relative to the boundaries identified in no-fly zone 510. In alternate embodiments, drone 100 uses gyroscopic and accelerometer data to calculate its position with respect to base station 110 and is only aware of its relative position to drone base station 110. In these embodiments, the data representing no-fly zone 510 is stored as positions or a border (e.g., a polygon) relative to drone base station 110. In one or more embodiments, a radius is set with drone base station as the center and the border of no-fly zone 510 is simply defined as the circle having the defined radius.

In the case where the no-fly zone is determined by a regulatory agency, the system can include an override capability such that authorized personnel can still deploy the lights. This override capability can be implemented with physical means, such as keys, with passwords, through remote enablement, or other electronic override means. The system, in various embodiments, can perform logging of some or all such actions so that an audit trail can be available of who authorized the no-fly override.

Drone 100 and base station 110 can be synchronized so that the drone 100 can inform base station 110 regarding its intended destination/hover location. Additionally, drone 100 can be made aware of the location of base station 110 and be programmed to not fly beyond a pre-programed radius from base station 110. The radius can be made to be programmable and in one or more embodiments, can be drawn on a mapping application. In one or more embodiments, the permitted drone fly zone can be irregular and programmed via a mapping application.

FIGS. 6A and 6B represent the types of objective hazards that might be encountered by drone 100 during operation, and the imaging that can be used to avoid those objective hazards. Referring to FIG. 6A, a house 620 is identified as an objective hazard for drone 100, as are telephone pole 600 and telephone wires 610. Referring to FIG. 6B, in one or more embodiments, an image 630 produced by camera and illumination assembly 108 is used to identify objective hazards such telephone pole 600 and telephone wires 610. In one or more embodiments, image recognition techniques (e.g., an object detection and/or edge detection algorithms) are used to identify the objective hazards which drone 100 then avoids. The image processing can be performed in drone 100, in base station 110, or at a remote server or distributed computing system (e.g. a cloud computing system).

In alternate embodiments, as illustrated in the right-hand portion of FIG. 6B, a map 640 contains information regarding objective hazards, that information being used by drone 100 to avoid the objective hazards. As illustrated, the location of house 620 and power lines within power line right of way 650 are identified on map 640 and provide sufficient information to allow drone 100 to avoid the objective hazards.

Imaging and object detection can be done using one or more of optical, lidar, radar, acoustical, or other technologies-. In one or more embodiments, images collected using non-optical techniques are combined with traditional light images to create additional detail or for use in object detection and image analysis. These detection systems can be placed in various locations on the drone to provide image and object detection in one or more directions above, below, and to the sides of the drone as it is operating. One or more of these technologies can be deployed simultaneously to enable detection of different types of objects, or to provide redundancy.

Figure 7A:
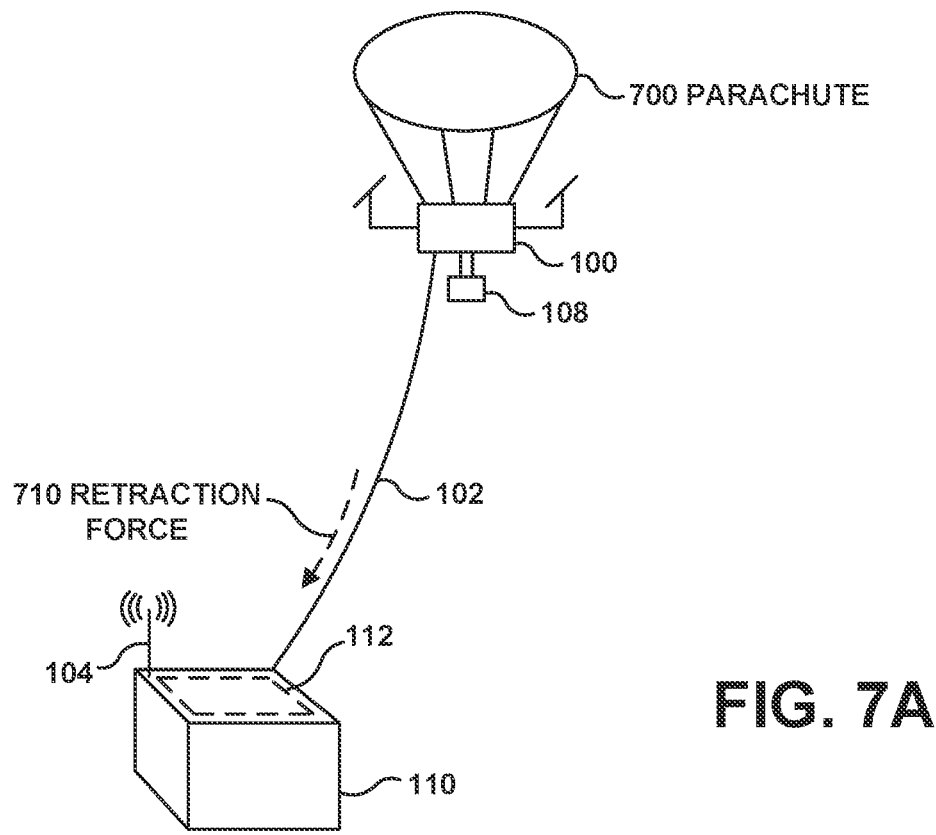
FIGS. 7A and 7B illustrate safety mechanisms for drones including parachutes and rocket deceleration, respectively, in accordance with example embodiments.
Figure 7B:
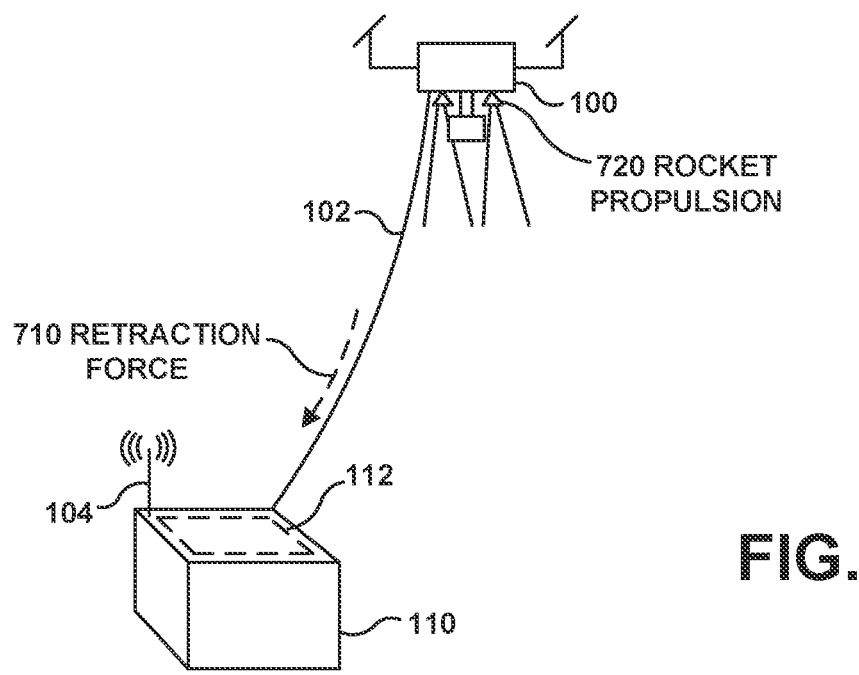

Referring to FIGS. 7A and 7B, safety mechanisms can be employed to lessen the probability of harm to ground personnel and damage to objects in the event of failure of the propulsion system/propellers of drone 100. Referring to FIG. 7A, a parachute 700 can be deployed in the event of a failure. Parachute 700 can be deployed passively or via an ejection system contained within drone 100. FIG. 7B illustrates a rocket propulsion system 720 which is used to deaccelerate drone 100 in the event of a failure of the propulsion system/propellers of drone 100. In one or more embodiments, compressed air is used for rocket propulsion system 720. In other embodiments, a chemical-based system is used to generate a compressed air stream, through the combining of two compounds that releases a gas.

In other embodiments, a typical solid rocket is ignited. In the embodiments of FIGS. 7A and 7B, a retraction force 710 can be applied to tether 102 and used to assist drone 100 descend towards drone base station 110 to minimize the possibility of harm to individuals or objects in the vicinity by having drone 100 land near drone base station 110. The retraction force 710 can be generated from a number of mechanisms including a spring loaded spooling mechanism, electrical motor, or other mechanisms that are part of the tether control system that manages tether 102. Conveniently, tether 102 may be retracted into a spool or similar mechanism that takes up a limited amount of space either on, within, or nearby base station 110, and may be easily deployed again from this location.

In alternate embodiments, cushioned propellers are used to minimize harm to personnel and objects in the area in the event of failure of drone 100. Additional padding/cushioning on drone 100 can be used to help minimize the possibility of damage both to drone 100 and personnel and objects in the event of a sudden descent. In one or more embodiments, autorotation of the propellers can be used to slow the descent. The primary light can also be automatically turned off in the case of an emergency to ensure that ground personnel are not accidentally blinded. The light can also be used as beacon with very short duration flashes, or by flashing of only a portion of the array.

In other embodiments, audio signals, such as horns and alarms can sound on the drone in the event of unplanned descent, or even during a planned ascent to alert workers in the area to a change of position.

Notification to personnel responsible for overseeing the health and operational status of the lighting system can occur via a traditional light pole as one commonly seen on industrial machines, audible alarms, or through network notifications to the operators on their cell phones, tablets, or other devices. These network notifications can also go to one or multiple individuals or devices, or even to a central monitoring facility.

The tether cable itself can be designed to be easily visible. Mechanisms can be passive, such as the addition of colored and/or reflective fibers in the outside coating of the tether, or active with small lights, typically LEDS, embedded in the cable such that one would see a line of lights where the tether is in the air. These small lights would be similar in concept to a Christmas tree light string where the loss of one LED in the string would not cause failure of all the lights. These lights can also be used as signaling mechanisms to the operating personnel, so for example they could flash yellow if the system is running low on fuel, or is experiencing another operational issue, and red if there is imminent danger of the drone having to land.

In order to provide for further user safety, a Ground Fault Circuit Interrupter (GFCI) can be used on either one or both of the power supply voltages (motor and lighting supplies) being sent to the drone via the tether to protect users from inadvertent shorts to ground. In an embodiment, the GFCI senses a current imbalance between the supply (hot) and return (neutral) lines, and causes the GFCI to trip, opening the circuit and protecting the user. In an embodiment, a safety power dump circuit can be used which dumps the wiring to ground on GFCI command (once disconnected from the sources) further reducing the risk of injury to a user.

Additionally, lightning protection can be provided in the form of a grounding rod, which is placed in the ground near the case and is electrically connected to the metal components of the case. In an embodiment, a grounding sheath is used on the tether and is also connected to ground via the rod. In this embodiment, should the drone and/or lighting system be struck by lightning the sheath in combination with the grounding rod provide a suitable ground path and minimizes the hazard to personnel in the vicinity.

The LED arrays can be designed to be mounted above the propellers in which case the control electronics would be configured to turn off the light as a propeller passes through the light beam. In this way there would be minimum flicker on the surface as well as minimum reflected light upwards. Detection of propeller position can be done using rotational sensors, such as magnet and Hall effect sensors, or via ultrasonic proximity sensors or other means.

The LED arrays can also be designed to be mounted as a removable accessory on drones that can be used on or off tether. When mounted as a removable accessory, the structure of the light array, and associated cooling heatsinks, can be formed in various shapes to produce a minimum or at least limited impact on the operation of the host drone. For example, the array can be designed such that the weight alignment of the light array when mounted on the host drone minimize or at least decrease the impact on the center of gravity of the drone. The lights can also be configured in a wide square with openings in between to allow sensors, such as optical or LIDAR downward position sensors to function normally. Similarly, the system can be designed to mount such that other safety or flight sensors like sideways obstacle avoidance sensors have a clear path through the lighting accessory for normal operation.

The LED arrays configured as a removable accessory can further integrate into the control systems on the drone to provide control of the lights, such as setting intensity, direction, as well as receiving status information through the standard control system of the host drone.

In some embodiments, the control information can be provided to the light array through the standard host interface, such as an accessory gimbal or universal serial bus type-C (USB-C) port, but the high power electrical path used to power the LED lights can come separately through cables connected directly to the tether power system.

In one or more embodiments, a control system is used to control cooling of an LED such as LED array 400 or other lighting panel. This may be facilitated by use of propeller backwash from drone 100 to cool LED array 400 for a period of time after the LEDs are turned off. In one or more embodiments, a timer is used, with the cooling off time period being determined by the length of time the LEDs were on. In other embodiments, a default time period (e.g. 3 min) is set. In other embodiments, temperature sensors placed in or near LED array 400 are used to monitor the temperature of the array and to determine when the propeller backwash has sufficiently cooled the lighting system. The aforementioned techniques, based on timed use of propeller backwash for cooling, can be used to greatly extend the lifetime of the lighting system, especially when using LEDs, which are degraded by excess temperatures and in some cases may be permanently damaged by overheating. Other techniques for cooling LED array 400 or other lighting systems include heatpipes, water cooling, use of flexible copper strand heatpipes, remote heatsinks under the propeller backwash, or even a separate fan.

In order to deal with cold weather situations, where icing of the propellers or poor performance of the batteries can impair performance, a number of enhancements can be used, including but not limited to a deicing system on the drone which uses heated propeller blades for deicing, or in which deicing liquids are extruded from a storage system and sprayed on the blades. The batteries may also be heated to provide better performance at lower temperatures.

In an embodiment, the lighting system is integrated directly into the propellers of the drone, with a slipring providing power. An advantage of this embodiment is that the lights are cooled by the constant rotational motion and flow of air over the propellers. The heat from the lights also acts to deice the propellers.

One of the purposes of tether 102 is to provide power to drone 100, as well as for data communications to/from drone 100, both potentially used in conjunction with the lighting provided by camera and illumination assembly 108. Accordingly, tether 102 may include one or more sets of electrical wiring to supply electrical power to drone 100 (e.g., copper, aluminum, or other types of wiring). Further, tether 102 may include one or more sets of electrical or optical wiring to provide two-way communication capabilities to drone 100 (e.g., Ethernet cable such as CAT-5 or CAT-6 cable, or other types of wiring including twisted pair cable in general to support RS-485, Controller Area Network bus, also known as CAN bus, or other communication protocols). In some cases, power and communications may be supplied by the same physical wiring, such as with powerline communications technology or Power over Ethernet (POE), for example.

Figure 8:
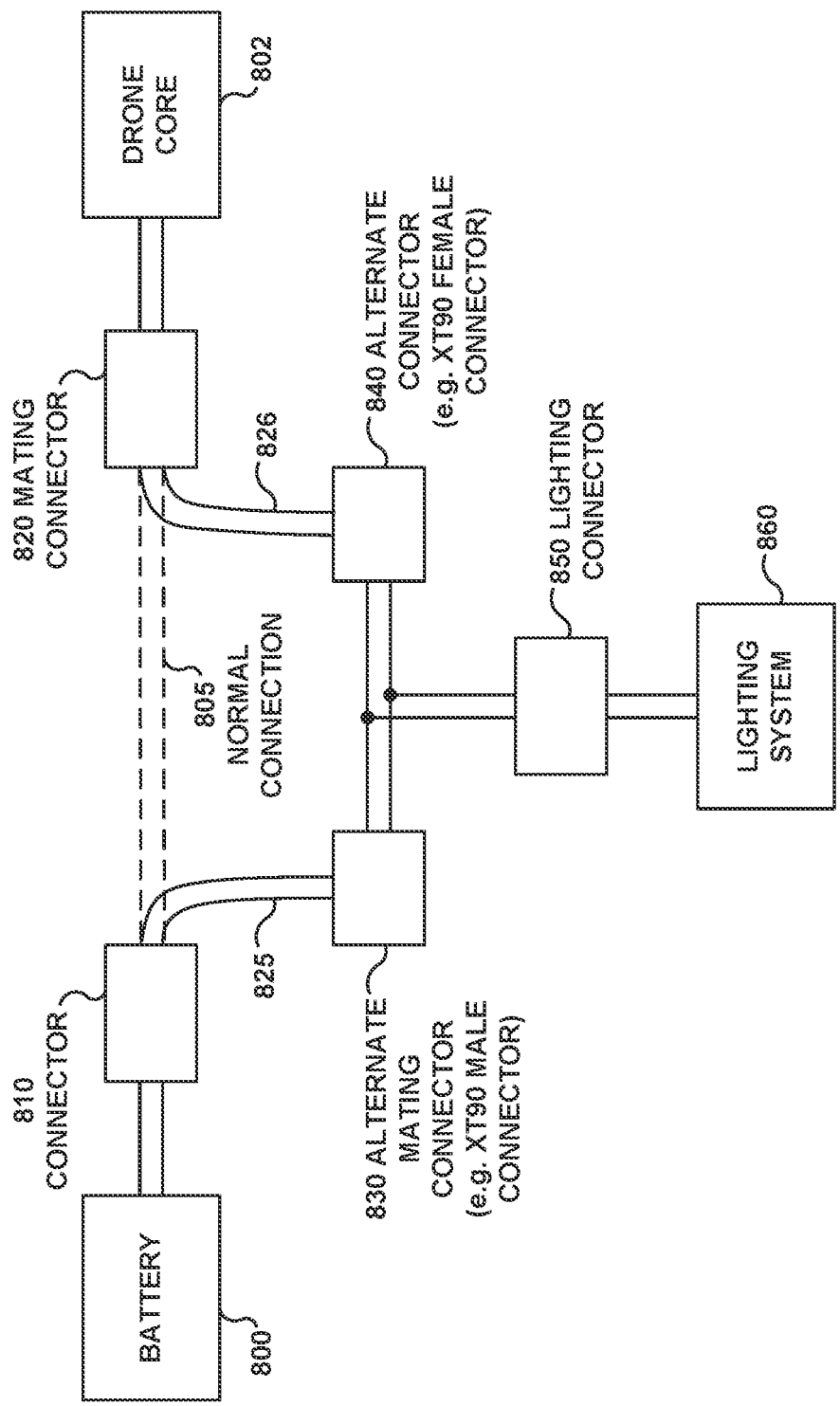
FIG. 8 illustrates interception of power in a drone, in accordance with example embodiments.

FIG. 8 illustrates an embodiment in which power is intercepted for the camera and illumination system, and in particular, for lighting system 860. Although illustrated without reference to tether 102, power supplied by battery 800 can be substituted with a power connection from tether 102. Referring to FIG. 8, battery 800 normally connects to drone core 802 (encompassing all of the normal flight systems of drone 100, excluding the lighting) through connector 810, a normal connection 805 and to mating connector 820. In one or more embodiments, an alternate mating connector 830 is used to intercept power via a power tap send 825. Power is provided to lighting system 860 via lighting connector 850 and to drone core 802 via alternate connector 840 and power tap send 826. Such embodiments provide the significant power needed by lighting system 860, as well as drone core 802.

Figure 9:
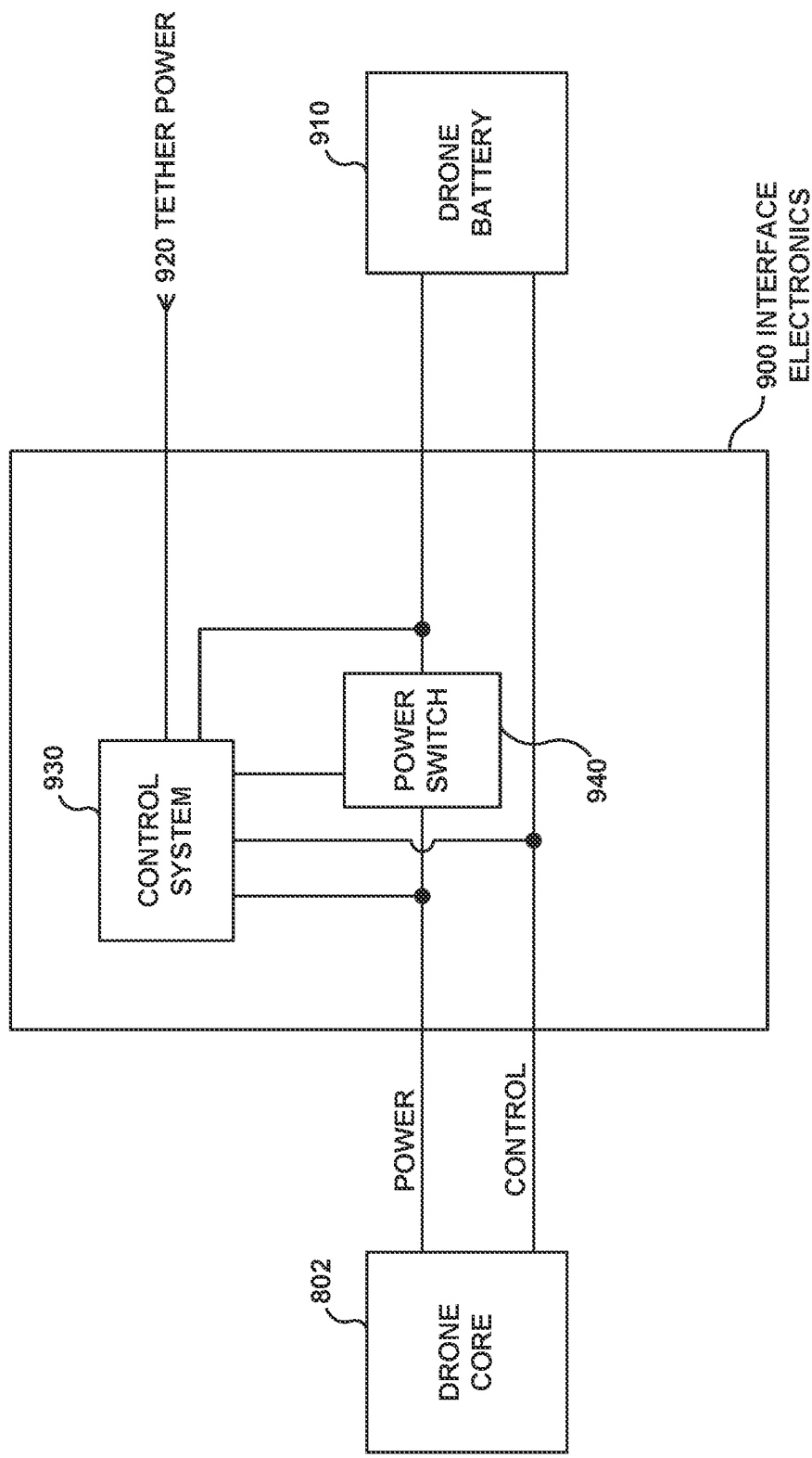
FIG. 9 illustrates a system for interception of both power and control signals in a drone, in accordance with example embodiments.

In some drone units, including the DJI Matrice series of drones, there are more sophisticated interfaces that can require a more complex interfacing mechanism such as that shown in FIG. 9. As shown in FIG. 9, drone core 802 is intended to be in communication with drone battery 910. In an embodiment, the use of interface electronics 900 allows for interception of control signals by control system 930, and allows for the use of a power switch 940 that allows tether power 920 to be substituted for power from drone battery 910. This allows for substitution of power as well as providing for a control interface. In an embodiment, access to control and management of drone core 802 is provided via open source software, such that the manufacturer of drone core 802 allows access to some or all of the commands, interface, and controls of the system.

FIGS. 10-14 show a sled based interface system that can be used to allow for interfacing to the power system of drone 100 as well as for housing one or more OEM batteries.

Figure 10:
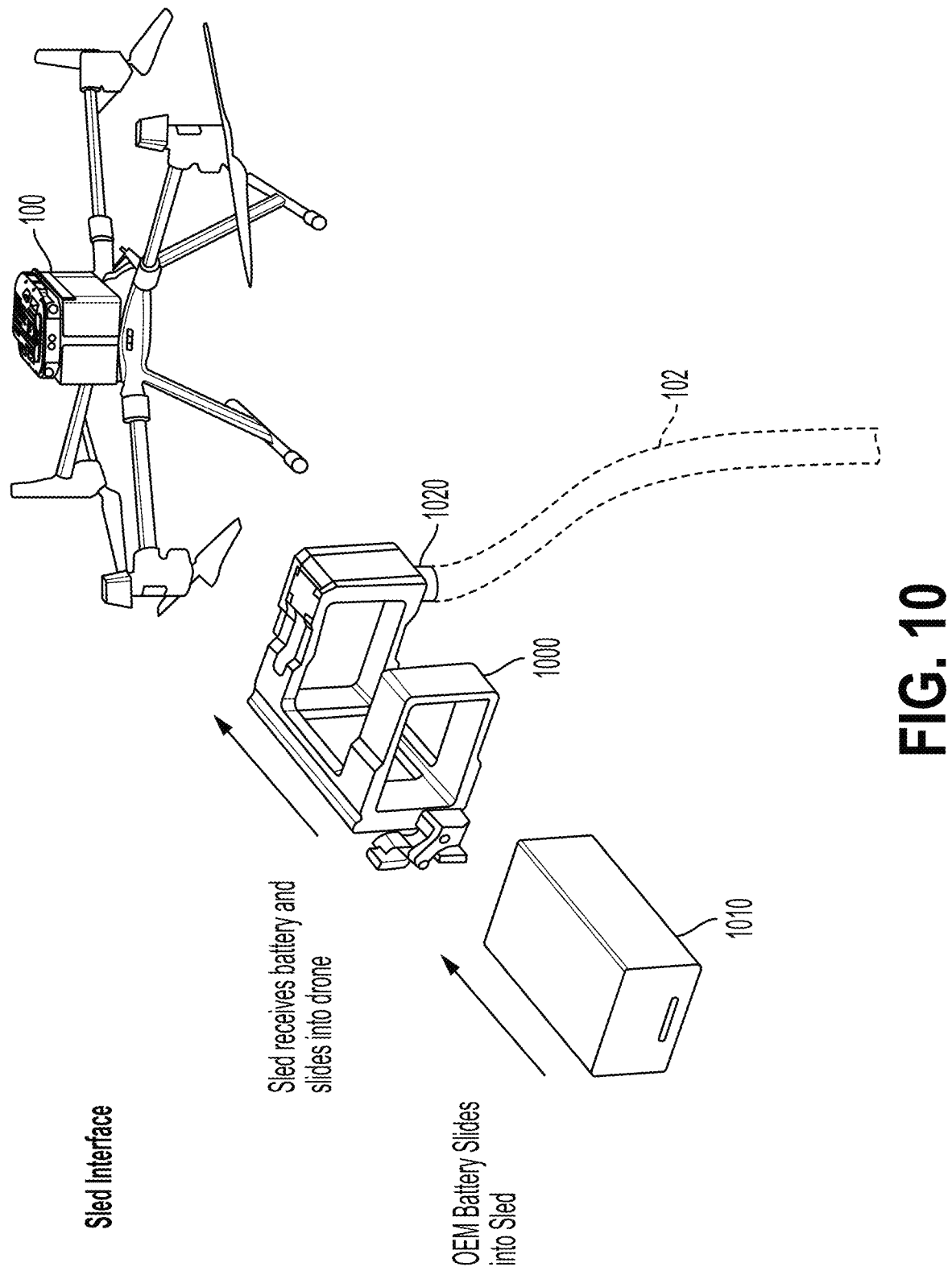
FIG. 10 illustrates a sled interface that provides a power interface using an Operating Equipment Manufacturer (OEM) battery, in accordance with example embodiments.
Figure 11:
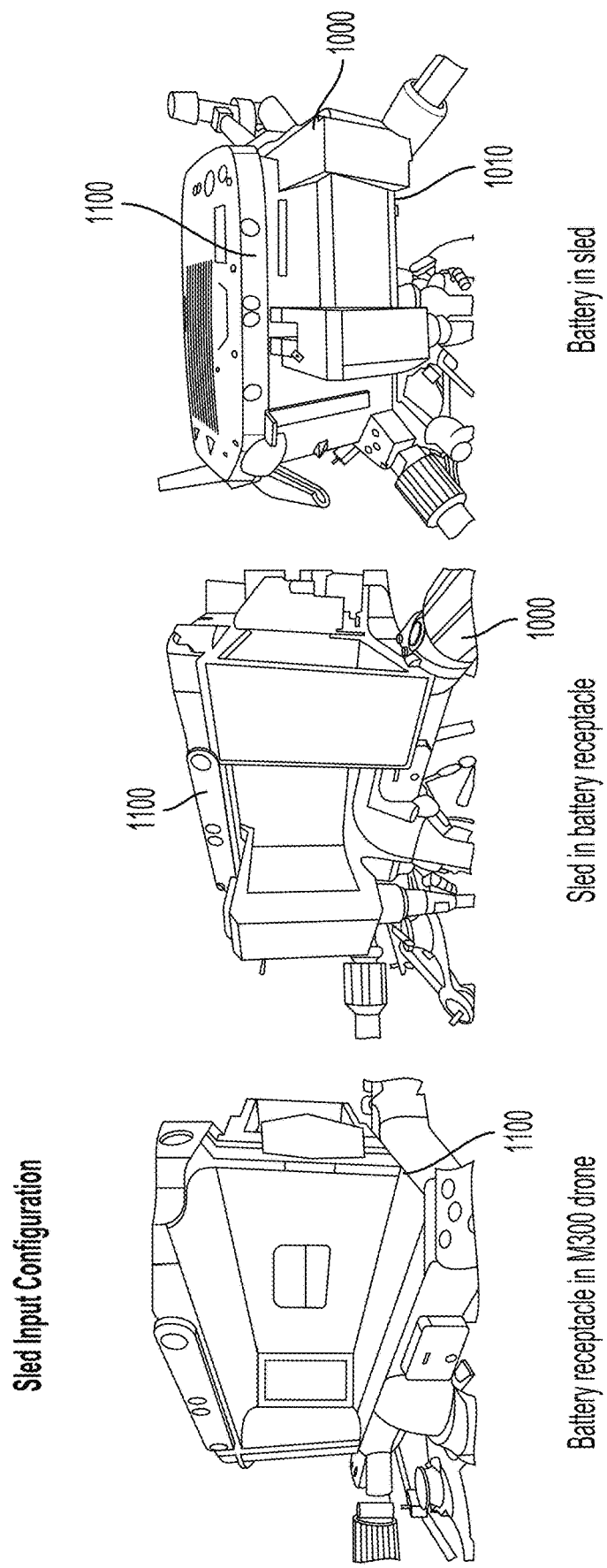
FIG. 11 illustrates the sled input configuration, in accordance with example embodiments.

As illustrated in FIG. 10, a sled 1000 can be used to house an OEM battery 1010, with sled 1000 mating to the battery receiving ports of drone 100. Sled 1000 also provides the interface to tether 102 via tether interface 1020. FIG. 11 provides a more detailed view of battery receptacle 1100, which receives sled 1000 and OEM battery 1010.

In some instances, two or more batteries may be used, requiring the use of multiple sleds, or a sled designed with multiple interfaces and housing multiple batteries. FIG. 12 illustrates the use of two sleds, a port side sled 1200 and a starboard side sled 1210. OEM batteries such as OEM battery 1010 can be used in both sleds. Other configurations using one or more sleds with multiple batteries can also be used.

Figure 13:
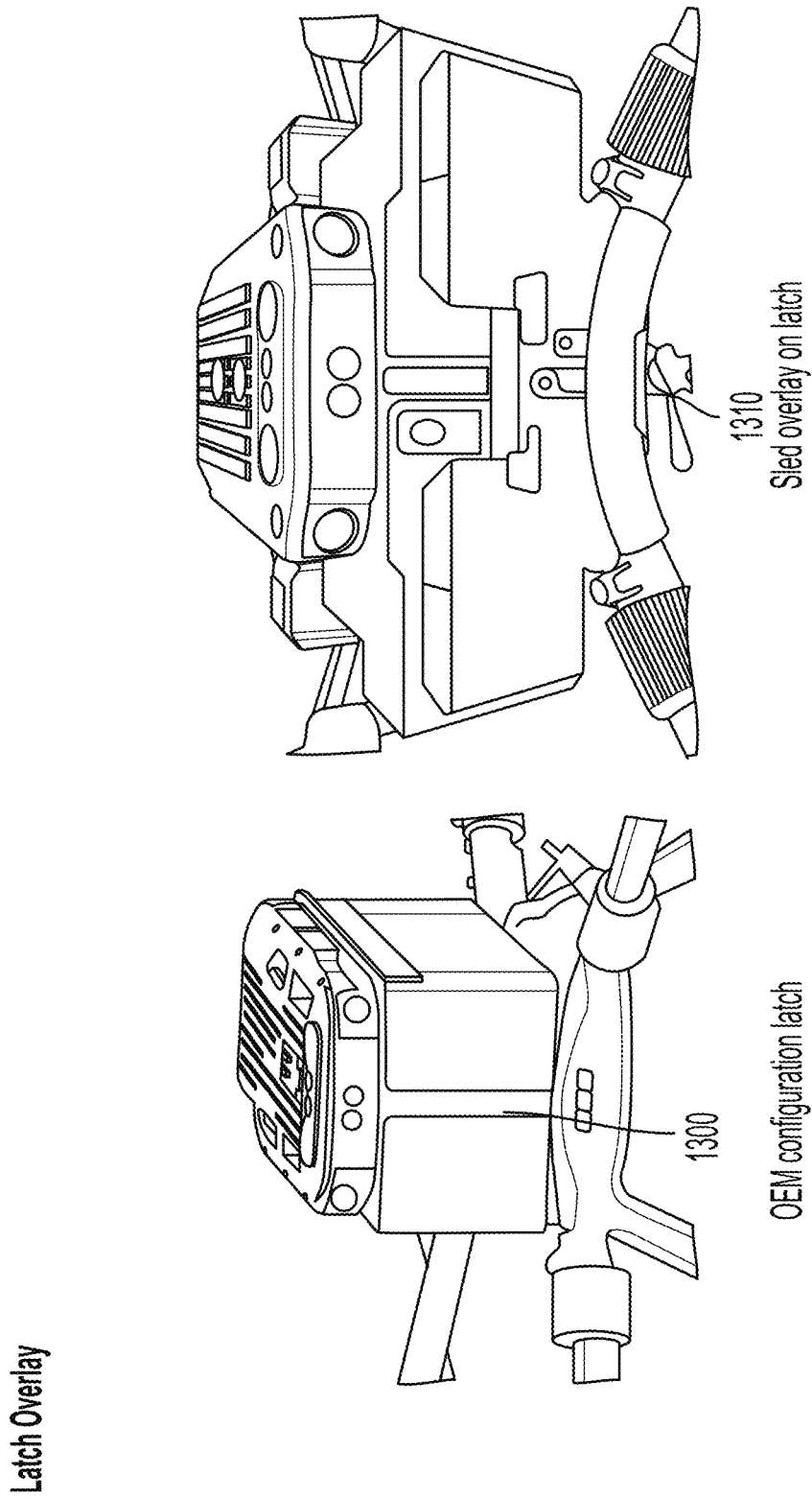
FIG. 13 illustrates an OEM configuration latch and sled overlay latch, in accordance with example embodiments.

FIG. 13 illustrates the use of both an OEM configuration latch 1300 and a sled overlay latch 1310 to provide engagement of and to secure the batteries in the case of the OEM configuration, or for engagement of and to secure the batteries in the sled configuration in the event one or more sleds are used to intercept the OEM power system.

FIG. 14 illustrates further detail regarding the positioning of OEM battery 1010 in sled 1000 and the resulting repositioning of the battery connector in drone 100. As shown in FIG. 14, the original battery interface 1400 is substituted by a modified battery interface 1410. In an embodiment, OEM battery 1010 is rotated 90 degrees for insertion in to sled 1000. Use of the modified battery interface 1410 and the sled allows for housing of power interception circuitry such as that illustrated in FIGS. 8 and 9 as well as for housing tether interface 1020. As will be appreciated by one of skill in the art, other configurations, including sleds and other mechanical interfaces, can be utilized to house tether interface 1020 and to provide access to the drone power and control bus. These alternate configurations including modified connector assemblies and interface blocks that go between the original battery interface 1400 and an alternate interface that allows for interconnection with tether 102 to allow power to be supplied to drone 100 as well as for transmission/reception of control and data signals over tether 102.

Figure 15:
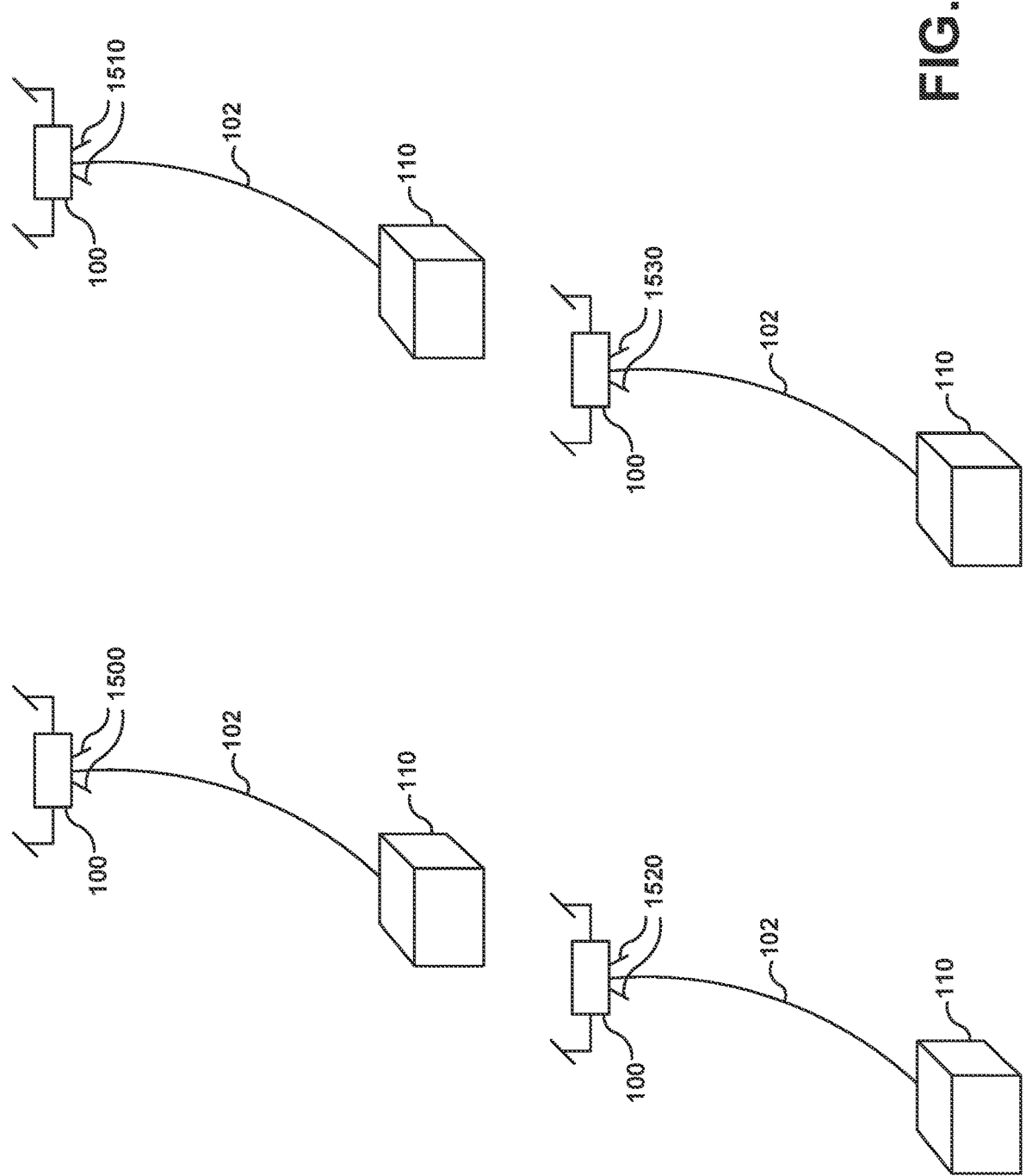
FIG. 15 illustrates use of one or more drones as aerial antenna systems, in accordance with example embodiments.

FIG. 15 illustrates the use of one or more drones 100 as bearers of antennas for some type of wireless or broadcast services. In the embodiment shown in FIG. 15, multiple drones 100, forming the corners of a rectangle, are launched from their respective base stations 110 and are connected to the respective base stations 110 via their respective tethers 102. In the embodiment shown in FIG. 15, antenna systems 1500, 1510, 1520, and 1530 are deployed on drones in each corner of the rectangle.

Although antenna systems 1500, 1510, 1520, and 1530 are shown as dipole antennas, a variety of antenna systems can be utilized and hosted by drone 100. This can also include the incorporation of the antenna in tether 102, and can include long wire radiating elements as well as leaky waveguide (e.g. coaxial) antennas, or other structures that purposefully leak radiation along tether 102 to create a desired radiation pattern and to provide for communications in an area below the drones 100.

In some embodiments, antennas 1500, 1510, 1520, and 1530 act as a phased array system with the phase of the signal being fed to each antenna resulting in desired radiation pattern under drones 100. This can be useful for directing communications signals to desired areas. As will be understood by one of skill in the art, the wavelengths for which this technique is feasible are wavelengths comparable to the separation of drones 100. In instances, such as higher frequencies with wavelengths on the order of centimeters or less, other techniques can be used to control the radiation patterns of antennas 1500, 1510, 1520, and 1530. In an embodiment the power to each of antennas 1500, 1510, 1520, and 1530 is controlled to provide the desired radiation pattern and coverage for reception of signals.

The use of airborne drone antennas such as those illustrated in FIG. 15 allows for distribution of signals in different frequency bands and for different services including 802.11, 802.11g, WIFI-6, 4G LTE, 5G, and other telecommunications services based on a variety of standards.

The drone with integrated lighting system can be stored and transported in a case with wheels, which in one embodiment has two doors that open to allow retrieval of the drone with the integrated lighting system. The case also allows for storage of a handheld wireless controller for the system, as well as housing the dual power supplies (drone and lighting system). A mechanical level, such as a bubble (spirit) level can be incorporated into the case. In an embodiment, the case is made of a composite material to reduce weight, and fully loaded weighs approximately 70 lb, allowing for human transport.

In an embodiment, ingress protection is provided as per a standard and the case is designed to meet the IP67 standard which provides for protection against contact with objects greater than 1 mm in diameter, such as a wire or small tool, complete protection against dust over extended time, and protection against short periods of immersion in water (15 cm and 1 m). In an embodiment, the drone and lighting system itself may have the same or different ingress protection rating.

In an alternate embodiment, the drone and lighting system are integrated into a consumer vehicle such as the trunk of a sedan or the back of a pickup truck. In an embodiment, the controls for the drone and lighting system can be integrated into the dashboard of the vehicle or can alternatively be provided via a cell phone app.

In an embodiment, the drone with lighting system can be mounted upside-down and without launching to provide for vertical illumination, such as would be required to illuminate the underside of a bridge. In an embodiment, a tripod mount is built into the top surface of the drone for such applications. The tripod can also be integrated into the case, with a matching mount point on the drone to connect it to the tripod. When in this configuration, the drone 100 could also incorporate a safety interlock, either mechanical, electrical, or software based, which would prevent the drones rotors from operating, as a safety measure. In the case where the rotors are providing the cooling airflow for the LED lights, the rotors may operate at a safer slow speed only sufficient to provide the necessary cooling. Further, in this configuration, the light gimbals and associated control systems could be configured to be fully operational.

Figure 16:
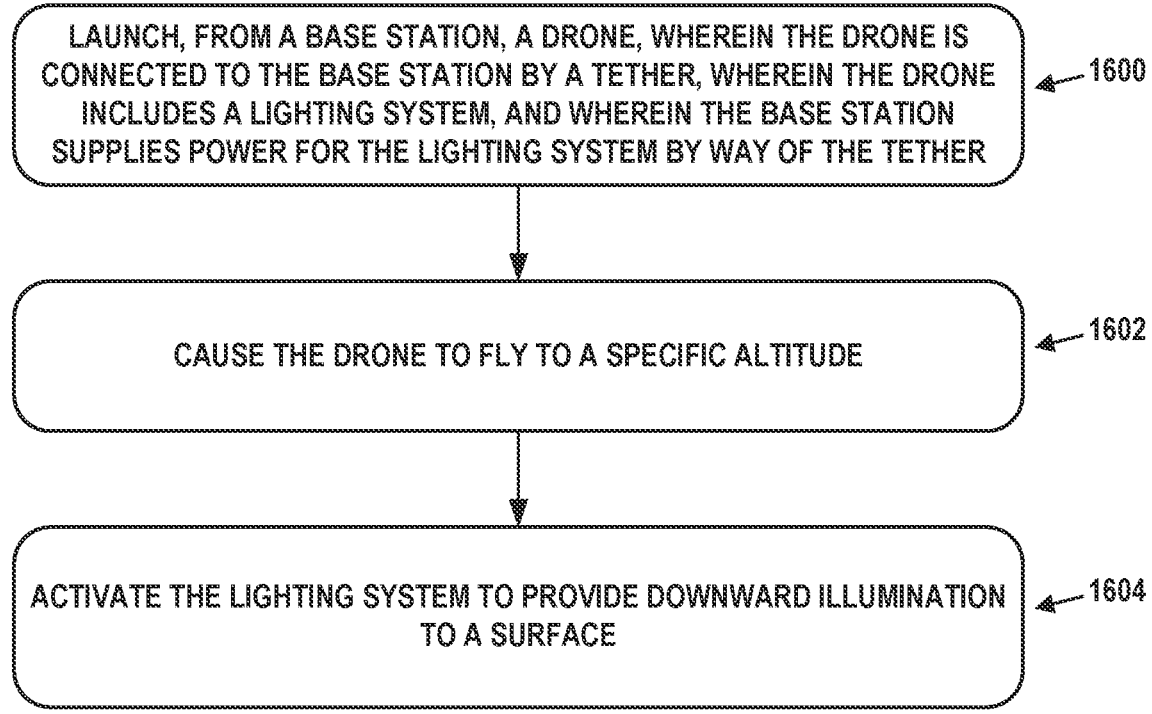
FIG. 16 is a flow chart, in accordance with example embodiments.

FIG. 16 is a flow chart illustrating an example embodiment. The process illustrated by FIG. 16 may be carried out by a drone, a base station, a remote controller, or some combination thereof. However, the process can be carried out by other types of devices or device subsystems. The embodiments of FIG. 16 may be simplified by the removal of any one or more of the features shown therein. Further, these embodiments may be combined with features, aspects, and/or implementations of any of the previous figures or otherwise described herein.

Block 1600 may involve launching, from a base station, a drone, wherein the drone is connected to the base station by a tether, wherein the drone includes a lighting system, and wherein the base station supplies power for the lighting system by way of the tether.

Block 1602 may involve causing the drone to fly to a specific altitude. The specific altitude may be predetermined or determined in-flight by the drone, the base station, or a remote controller.

Block 1604 may involve activating the lighting system to provide downward illumination to a surface. The lighting system may be activated once the drone reaches the specific altitude or when the drone is on its way to the specific altitude.

In some embodiments, the tether contains active light sources.

In some embodiments, the active light sources run for substantially a length of the tether.

In some embodiments, the tether contains light reflecting elements.

In some embodiments, the light reflecting elements run for substantially a length of the tether.

In some embodiments, the base station contains a wireless communications transceiver.

Some embodiments further involve directionally controlling, by the base station, the lighting system.

In some embodiments, a camera is operably attached to the drone.

In some embodiments, the lighting system provides at least 20,000 lumens.

In some embodiments, the downward illumination comprises an illumination pattern. These embodiments may further involve altering the illumination pattern.

In some embodiments, an illumination control system of the drone alters the illumination pattern.

In some embodiments, the downward illumination comprises an illumination pattern. These embodiments may further involve altering an intensity of the downward illumination.

In some embodiments, the drone also includes a light level output adjustment controller electrically connected to the lighting system.

In some embodiments, the light level output adjustment controller modifies light output of the lighting system based on an amount of tether deployed.

In some embodiments, the light level output adjustment controller modifies light output of the lighting system based on a vertical distance of the drone from the base station.

In some embodiments, the light level output adjustment controller modifies light output of the lighting system based on a distance of the drone from the base station.

In some embodiments, the light level output adjustment controller modifies light output of the lighting system to decrease the downward illumination as the drone gets closer to the surface.

In some embodiments, the light level output adjustment controller modifies light output of the lighting system based on a calculation of the downward illumination including at least parameters of distance from the surface and light intensity.

Some embodiments may further involve operably adjusting, by way of the light level output adjustment controller, independent portions of the lighting system.

Some embodiments may further involve varying an altitude of the drone to obtain a specific intensity of illumination.

Some embodiments may further involve operably adjusting, by way of the light level output adjustment controller, the lighting system based on altitude restrictions.

In some embodiments, an illumination monitor is operably attached to the drone.

In some embodiments, reflective elements are deployed in a region illuminated by the lighting system.

In some embodiments, the illumination monitor measures incident light.

In some embodiments, the illumination monitor is incorporated into a mobile computing device.

In some embodiments, the mobile computing device is a smart phone.

In some embodiments, the illumination monitor is a wearable sensor.

In some embodiments, a light directional controller is electrically connected to the lighting system.

Some embodiments may further involve altering, by way of the light directional controller, an altitude of the drone to obtain a desired cone of illumination on the surface.

Some embodiments may further involve altering, by way of the light directional controller, a yaw or an attitude of the drone to obtain a desired cone of illumination on the surface.

In some embodiments, lighting system comprises a gimbal operatively coupled to the light directional controller.

Some embodiments may further involve illuminating, by the lighting system, a remote light position target.

In some embodiments, the remote light position target comprises one or more reflective fiduciary marks.

In some embodiments, the remote light position target transmits positional information.

In some embodiments, the remote light position target comprises a wearable device.

In some embodiments, the remote light position target comprises a smart phone.

In some embodiments, the lighting system comprises adjustable lenses for altering a shape of the downward illumination.

In some embodiments, the lighting system comprises a projector for light messaging. In some embodiments, the projector generates written messages on the surface.

In some embodiments, the lighting system comprises a laser based messaging system. In some embodiments, the laser based messaging system generates written messages on the surface.

In some embodiments, the power and control signals for the lighting system are supplied to the drone by way of two different physical ports of the drone.

In some embodiments, the power and control signals for the lighting system are supplied to the drone by way of two different electrical pathways in the drone.

Figure 17:
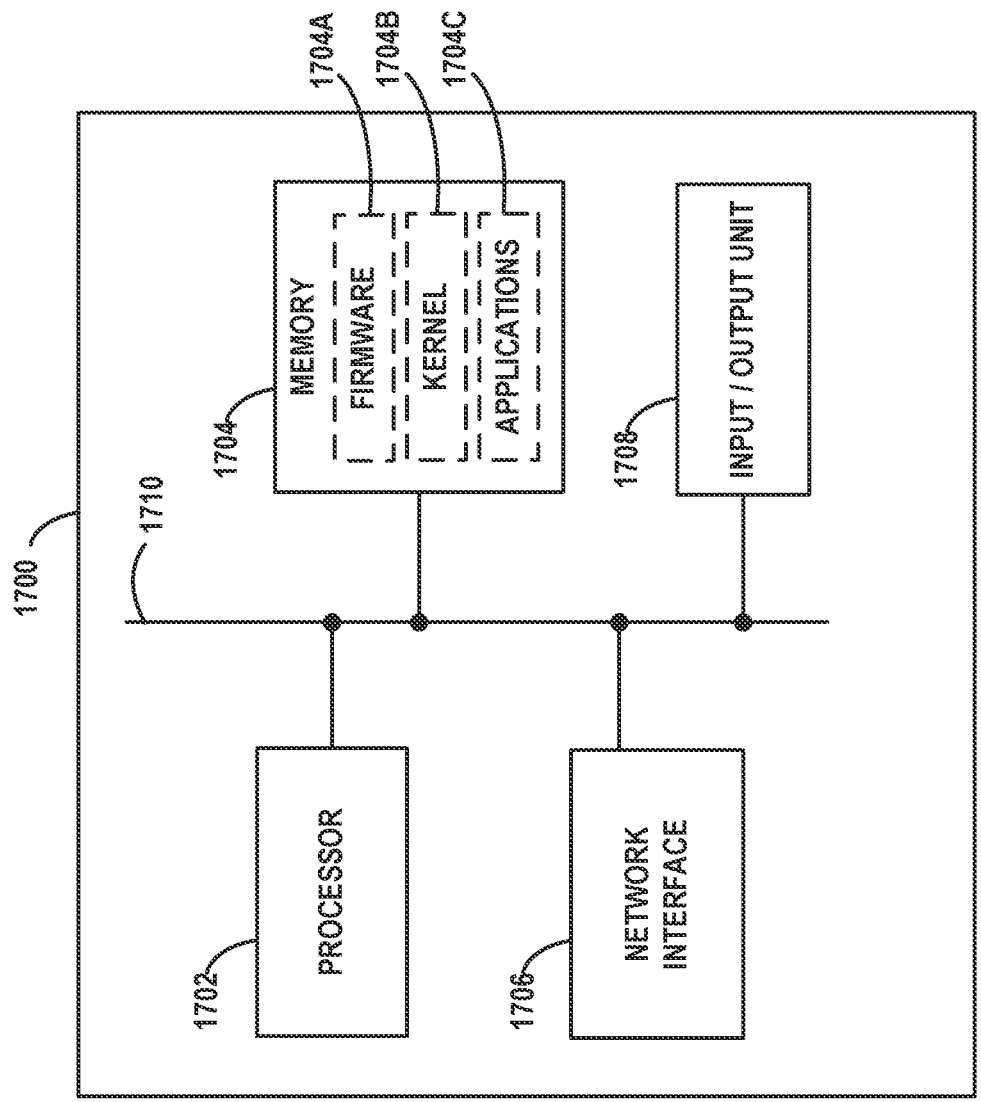
FIG. 17 is a computing device, in accordance with example embodiments.

FIG. 17 is a simplified block diagram exemplifying a computing device 1700, illustrating some of the components that could be included in a computing device arranged to operate in accordance with the embodiments herein. Computing device 1700 represents types of computing systems that could be used onboard drone 100, or as server 242 or a user-facing device that controls and/or managed the operations of drone 100 and/or server 242, for example. Thus, computing device 1700 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 1700 includes processor 1702, memory 1704, network interface 1706, and input/output unit 1708, all of which may be coupled by system bus 1710 or a similar mechanism. In some embodiments, computing device 1700 may include other components and/or peripheral devices (e.g., detachable storage, printers, and so on).

Processor 1702 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 1702 may be one or more single-core processors. In other cases, processor 1702 may be one or more multi-core processors with multiple independent processing units. Processor 1702 may also include register memory for temporarily storing instructions being executed and related data, as well as cache memory for temporarily storing recently-used instructions and data.

Memory 1704 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 1704 represents both main memory units, as well as long-term storage. Other types of memory may include biological memory.

Memory 1704 may store program instructions and/or data on which program instructions may operate. By way of example, memory 1704 may store these program instructions on a non-transitory, computer-readable medium, such that the instructions are executable by processor 1702 to carry out any of the methods, processes, or operations disclosed in this specification or the accompanying drawings.

As shown in FIG. 17, memory 1704 may include firmware 1704A, kernel 1704B, and/or applications 1704C. Firmware 1704A may be program code used to boot or otherwise initiate some or all of computing device 1700. Kernel 1704B may be an operating system, including modules for memory management, scheduling, and management of processes, input/output, and communication. Kernel 1704B may also include device drivers that allow the operating system to communicate with the hardware modules (e.g., memory units, networking interfaces, ports, and buses) of computing device 1700. Applications 1704C may be one or more user-space software programs, such as web browsers or email clients, as well as any software libraries used by these programs. Memory 1704 may also store data used by these and other programs and applications.

Network interface 1706 may take the form of one or more wireline interfaces, such as Ethernet (e.g., Fast Ethernet, Gigabit Ethernet, and so on). Network interface 1706 may also support communication over one or more non-Ethernet media, such as coaxial cables or power lines, or over wide-area media, such as Synchronous Optical Networking (SONET) or digital subscriber line (DSL) technologies. Network interface 1706 may additionally take the form of one or more wireless interfaces, such as IEEE 802.11 (Wifi), BLUETOOTH®, GPS, or a wide-area wireless interface. However, other forms of physical layer interfaces and other types of standard or proprietary communication protocols may be used over network interface 1706. Furthermore, network interface 1706 may comprise multiple physical interfaces. For instance, some embodiments of computing device 1700 may include Ethernet, BLUETOOTH®, and Wifi interfaces.

Input/output unit 1708 may facilitate user and peripheral device interaction with computing device 1700. Input/output unit 1708 may include one or more types of input devices, such as a keyboard, a mouse, a touch screen, and so on. Similarly, input/output unit 1708 may include one or more types of output devices, such as a screen, monitor, printer, and/or one or more LEDs. Additionally or alternatively, computing device 1700 may communicate with other devices using a USB or high-definition multimedia interface (HDMI) port interface, for example.

In some embodiments, one or more computing devices like computing device 1700 may be deployed to remotely support operations of drone 100 (e.g., remote monitoring, image processing, navigation, etc.). The exact physical location, connectivity, and configuration of these computing devices may be unknown and/or unimportant to client devices. Accordingly, the computing devices may be referred to as "cloud-based" devices that may be housed at various remote data center locations.

Figure 18:
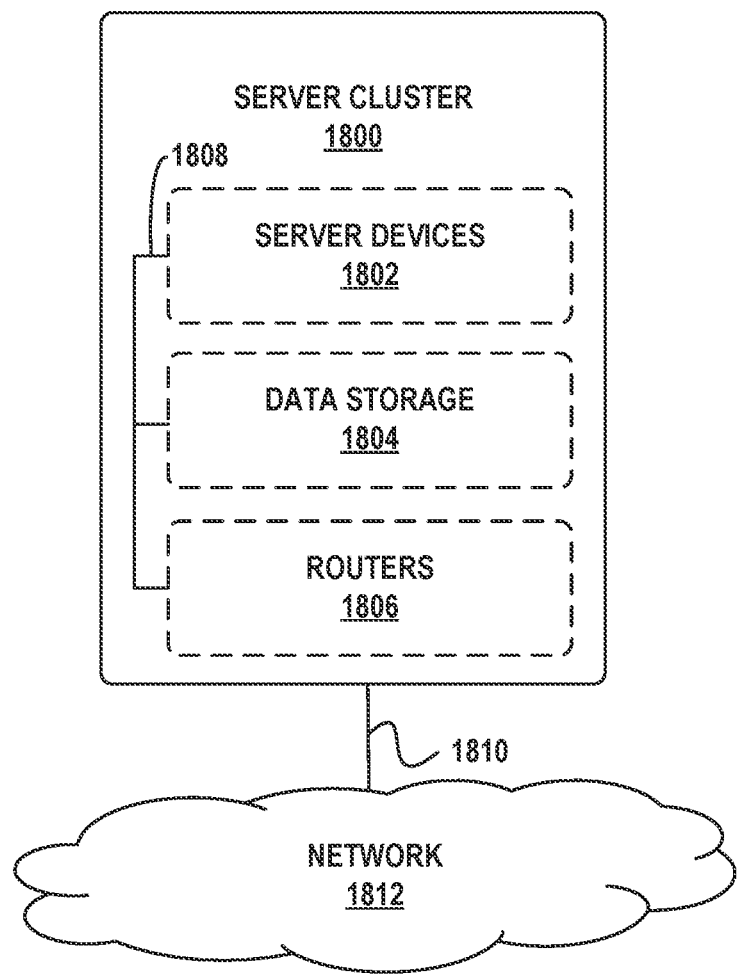
FIG. 18 is a cluster of computing devices, in accordance with example embodiments.

FIG. 18 depicts a cloud-based server cluster 1800 in accordance with example embodiments. In FIG. 18, operations of a computing device (e.g., computing device 1700) may be distributed between server devices 1802, data storage 1804, and routers 1806, all of which may be connected by local cluster network 1808. The number of server devices 1802, data storages 1804, and routers 1806 in server cluster 1800 may depend on the computing task(s) and/or applications assigned to server cluster 1800.

For example, server devices 1802 can be configured to perform various computing tasks of computing device 1700. Thus, computing tasks can be distributed among one or more of server devices 1802. To the extent that these computing tasks can be performed in parallel, such a distribution of tasks may reduce the total time to complete these tasks and return a result. For purposes of simplicity, both server cluster 1800 and individual server devices 1802 may be referred to as a "server device." This nomenclature should be understood to imply that one or more distinct server devices, data storage devices, and cluster routers may be involved in server device operations.

Data storage 1804 may be data storage arrays that include drive array controllers configured to manage read and write access to groups of hard disk drives and/or solid state drives. The drive array controllers, alone or in conjunction with server devices 1802, may also be configured to manage backup or redundant copies of the data stored in data storage 1804 to protect against drive failures or other types of failures that prevent one or more of server devices 1802 from accessing units of data storage 1804. Other types of memory aside from drives may be used.

Routers 1806 may include networking equipment configured to provide internal and external communications for server cluster 1800. For example, routers 1806 may include one or more packet-switching and/or routing devices (including switches and/or gateways) configured to provide (i) network communications between server devices 1802 and data storage 1804 via local cluster network 1808, and/or (ii) network communications between server cluster 1800 and other devices via communication link 1810 to network 1812.

Additionally, the configuration of routers 1806 can be based at least in part on the data communication requirements of server devices 1802 and data storage 1804, the latency and throughput of the local cluster network 1808, the latency, throughput, and cost of communication link 1810, and/or other factors that may contribute to the cost, speed, fault-tolerance, resiliency, efficiency, and/or other design goals of the system architecture.

As a possible example, data storage 1804 may include any form of database, such as a structured query language (SQL) database. Various types of data structures may store the information in such a database, including but not limited to tables, arrays, lists, trees, and tuples. Furthermore, any databases in data storage 1804 may be monolithic or distributed across multiple physical devices.

Server devices 1802 may be configured to transmit data to and receive data from data storage 1804. This transmission and retrieval may take the form of SQL queries or other types of database queries, and the output of such queries, respectively. Additional text, images, video, and/or audio may be included as well. Furthermore, server devices 1802 may organize the received data into web page or web application representations. Such a representation may take the form of a markup language, such as HTML, the eXtensible Markup Language (XML), or some other standardized or proprietary format. Moreover, server devices 1802 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as non-transitory computer readable media that store data for short periods of time like register memory and processor cache. The non-transitory computer readable media can further include non-transitory computer readable media that store program code and/or data for longer periods of time. Thus, the non-transitory computer readable media may include secondary or persistent long-term storage, like ROM, optical or magnetic disks, or solid-state drives, for example. The non-transitory computer readable media can also be any other volatile or non-volatile storage systems. A non-transitory computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

Turning back to the design of the drone, because the light source can generate significant heat energy, it may be necessary to provide cooling. Light Emitting Diode (LED) assemblies, for instance, generate significant heat that needs to be removed to keep the LED assembly at or below about 85 degrees Celsius to avoid damage to the LEDs. It is desirable to be able to direct the light assembly/LEDs, which can be accomplished using a gimbal assembly that can provide the ability to move the light assembly. However, allowing the light assembly to rotate on one or more axes can place additional requirements on the cooling system, due to changes in the geometry of the cooling and in particular due to changed airflow over the light assembly.

Figure 19:
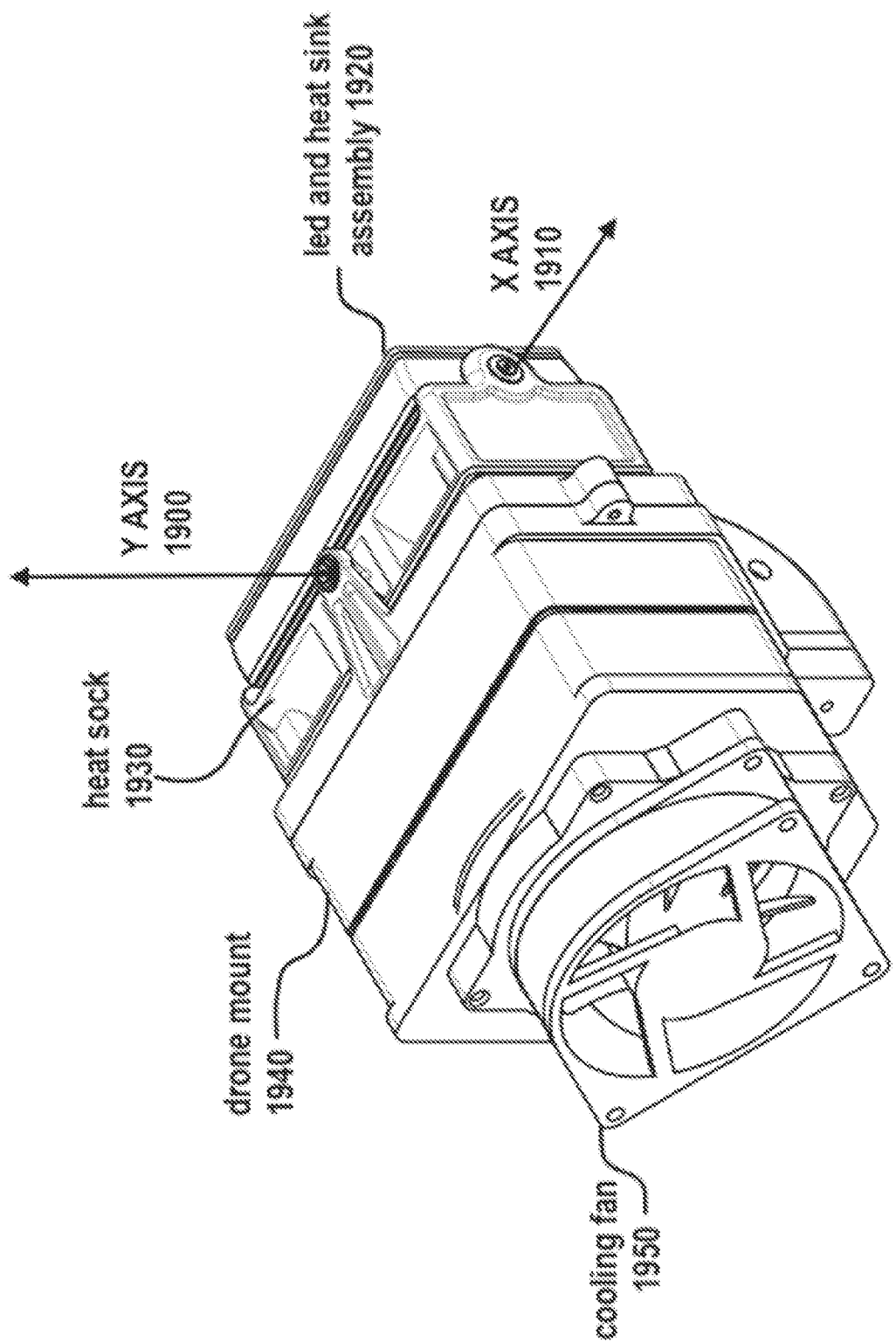
FIG. 19 illustrates a cooling fan and gimbaled LED/heat sink assembly, in accordance with example embodiments.

FIG. 19 illustrates a cooling fan and gimbaled LED/heat sink assembly in which a cooling fan 1950 directs air through a drone mount 1940. Drone mount 1940 also houses a flexible duct or heat sock 1930 that contains the airflow and directs it appropriately over the cooling fins. LED and heat sink assembly 1920 is gimbaled such that it can rotate about X axis 1910 as well as Y axis 1900. Although such rotation may be limited, it allows the light to be directed at angles other than normal to the ground. As will be discussed, heat sock 1930 allows the LED/heat sink assembly to be rotated on two axes while maintaining the airflow.

Figure 20:
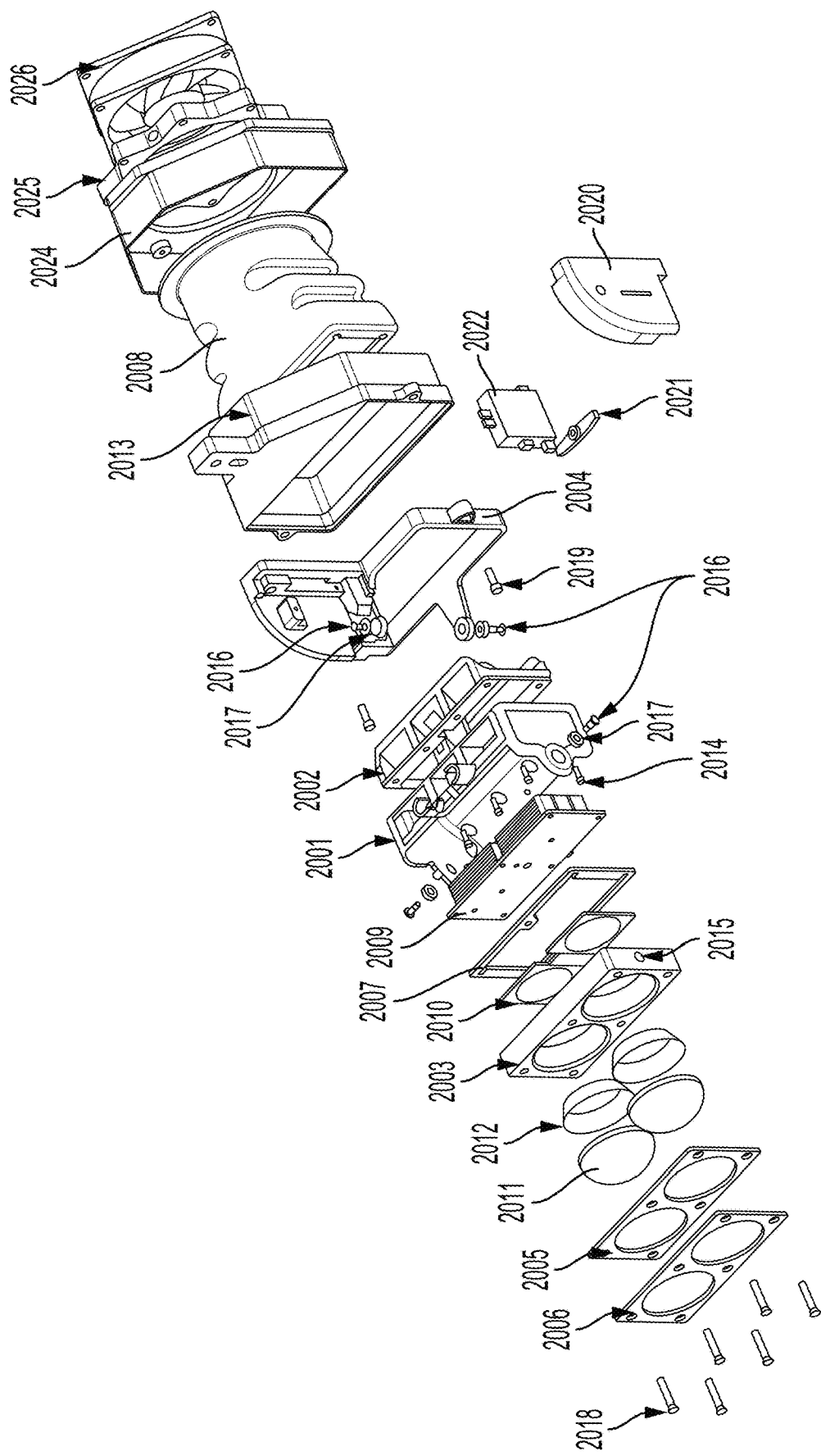
FIG. 20 illustrates an exploded or assembly view of the cooling fan and gimbaled LED/heat sink assembly of FIG. 19, in accordance with example embodiments.

As illustrated in the assembly view of FIG. 20, the cooling fan and gimbaled LED/heat sink assembly of FIG. 19 is comprised of a lower gimbal frame 2001 that connects to a lower sock mount 2002 and LED gimbal housing 2003 and primary gimbal mount 2004. An LED array cover seal 2005 connects to an LED array cover plate 2006, with a LED array upper seal 2007 providing additional sealing. Heat sock 1930 is used to direct cooling air over an LED array heat sink 2009, which contains cooling fins and is mechanically and thermally attached to an LED PCB array 2010. In an embodiment, a 60 degree lens 2011 is used in conjunction with a lens reflector 2012.

A drone side lower gimbal mount 2013 attaches to heat sock 1930. Stainless steel head screws 2014 are used to attach LED array heat sink 2009 to lower gimbal frame 2001. Tapered heat-set inserts 2015 are used retain lens reflector 2012 in LED gimbal housing 2003. Low profile precision shoulder screws 2016 are used in conjunction with oil-embedded flanged sleeve bearing 2017 to allow rotation about X axis 1910. An additional oil-embedded flanged sleeve bearing is mounted in primary gimbal mount 2004 to allow rotation about Y axis 1900.

Stainless steel flat head screws 2018 are used to hold the lens assembly together and attach it to LED array heat sink 2009. Aluminum head screws 2019 to assembly primary gimbal mount 2004 to lower gimbal mount 2013. A main servo cover 2020 covers and protects servo arm 2021 and main server motor 2022. A drone side upper mount 2024 attaches to an upper fan mount 2025 that houses cooling fan 2026.

Figure 21:
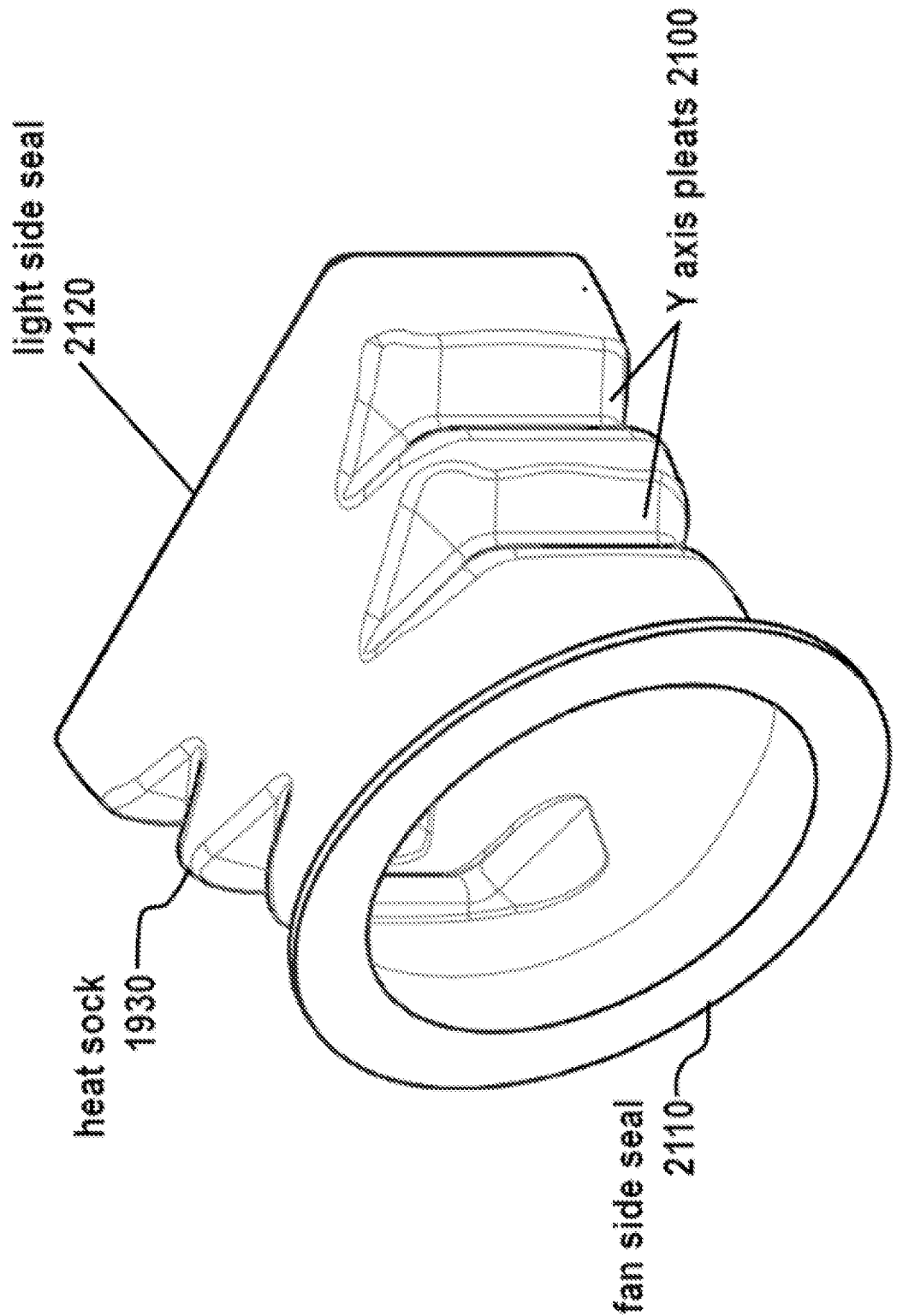
FIG. 21 illustrates a flexible duct, also known as a heat sock, in accordance with example embodiments.

A more detailed view of heat sock 1930 is provided in FIG. 21 illustrating Y axis pleats 2100, a fan side seal 2110 and a light side seal 2120. In operation, Y axis pleats 2100 allow for substantial rotation about the Y axis because the pleats expand on one side and compress on the other as LED and heat sink assembly 1920 is rotated on Y axis 1900. The flexibility of heat sock 1930 also allows for rotation of the LED and heat sink assembly 1920 about X axis 1910. In an embodiment, the degree of rotation about Y axis 1900 is greater than the degree of rotation about X axis 1910. In an alternate embodiment, pleats are incorporated into all four sides of heat sock 1930 to provide more equal amounts of rotation about both X axis 1910 and Y axis 1900. In an embodiment, heat sock 1930 is made of silicone such as silicone shore 00-20.

In an embodiment, a 24V fan having a diameter of 80 mm (3.15") producing a flow rate on the order of 75-100 cfm at a relatively high pressure on the order of 120-150 pa is used to create the airflow. In an alternate embodiment, a different source of air, such as turbulence off the rotors of the drone, can be used to create air pressure for cooling.

In operation, LED and heat sink assembly 1920 is rotated about the X axis 1910 such that the cooling fins of LED array heat sink 2009 are more exposed on one side than the other. As LED and heat sink assembly 1920 is rotated more about X axis 1910, the cooling fins may be completely occluded on one side and completely exposed on the other. The cooling air is contained by the heat sock 1930 and the air is forced over the exposed side of the cooling fins of LED array heat sink 2009, effectively removing the heat. In this way, heat sock 1930 in conjunction with LED/heat sink assembly 1920 maintains cooling airflow while LED/heat sink assembly 1920 is rotated about X axis 1910.

With respect to rotation about Y axis 1910, the Y axis pleats 2100 stretch on one side and compress on the other to accommodate the rotation and maintain sealing and airflow, thus supporting continuous cooling of LED and heat sink assembly 1920. In operation, the cooling fan and gimbaled LED heat sink assembly can operate in a wide range of weather conditions, with rain and precipitation passing through the assembly.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

What is claimed is:

1. A drone-based system comprising:
   a base station, wherein the base station is configured to provide drone control and power;
   a drone;
   a tether connecting the base station to the drone and configured to provide the drone with the power from the base station;
   a lighting system, operably attached to the drone via the tether, configured to generate illumination of a ground area, wherein the illumination of the ground area is controllable by modifying least one of an intensity of the illumination and a height of the drone above the ground area; and
   a light level output adjustment controller electrically connected to the lighting system and configured to modify the intensity of the illumination generated by the lighting system based on an amount of the tether deployed between the base station and the drone.

2. The drone-based system of claim 1, wherein the light level output adjustment controller is configured to modify the intensity of the illumination generated by the lighting system based on a calculation of the illumination including at least a parameter of a distance from a surface and a parameter of the intensity.

3. The drone-based system of claim 1, wherein the lighting system comprises a plurality of individually-addressable intensity-controlled lighting units.

4. The drone-based system of claim 3, wherein the light level output adjustment controller modifies output from at least one of the plurality of individually-addressable intensity-controlled lighting units to obtain quasi-uniform lighting of an illuminated surface region.

5. The drone-based system of claim 1, wherein the height of the drone above the ground area is varied to obtain a specified intensity of the illumination.

6. A method comprising:
   launching, from a base station, a drone, wherein the drone is connected to the base station by a tether, wherein the drone includes a lighting system, and wherein the base station supplies power for the lighting system by way of the tether, wherein the drone also includes a light level output adjustment controller electrically connected to the lighting system, and wherein the light level output adjustment controller modifies light output of the lighting system based on an amount of tether deployed;
   causing the drone to fly to a specific altitude; and
   activating the lighting system to provide downward illumination to a surface.

7. The method of claim 6, wherein the light level output adjustment controller modifies light output of the lighting system based on a vertical distance of the drone from the base station.

8. The method of claim 6, wherein the light level output adjustment controller modifies light output of the lighting system based on a distance of the drone from the base station.

9. The method of claim 6, wherein the light level output adjustment controller modifies light output of the lighting system to decrease the downward illumination as the drone gets closer to the surface.

10. The method of claim 6, wherein the light level output adjustment controller modifies light output of the lighting system based on a calculation of the downward illumination including at least parameters of distance from the surface and light intensity.

11. The method of claim 6, further comprising:
    operably adjusting, by way of the light level output adjustment controller, independent portions of the lighting system.

12. The method of claim 6, further comprising:
    varying an altitude of the drone to obtain a specific intensity of illumination.

13. The method of claim 6, further comprising:
    operably adjusting, by way of the light level output adjustment controller, the lighting system based on altitude restrictions.

14. A drone-based system comprising:
    a base station, wherein the base station is configured to provide drone control and power;
    a drone;
    a tether connecting the base station to the drone and configured to provide the drone with the power from the base station;
    a lighting system, operably attached to the drone via the tether, configured to generate illumination of a ground area, wherein the illumination of the ground area is controllable by modifying least one of an intensity of the illumination and a height of the drone above the ground area; and
    a light level output adjustment controller electrically connected to the lighting system and configured to modify the intensity of the illumination generated by the lighting system, wherein the light level output adjustment controller is configured to modify the intensity of the illumination generated by the lighting system based on a calculation of the illumination including at least a parameter of a distance from a surface and a parameter of the intensity.

15. The drone-based system of claim 14, wherein the lighting system comprises a plurality of individually-addressable intensity-controlled lighting units.

16. The drone-based system of claim 15, wherein the light level output adjustment controller modifies output from at least one of the plurality of individually-addressable intensity-controlled lighting units to obtain quasi-uniform lighting of an illuminated surface region.

17. The drone-based system of claim 14, wherein the height of the drone above the ground area is varied to obtain a specified intensity of the illumination.

* * * * *